US012809453B2

(12) United States Patent
Nandipati et al.

(10) Patent No.: US 12,809,453 B2
(45) Date of Patent: Nov. 24, 2026

(54) DETERMINING ORIENTATION INFORMATION

(71) Applicant: QUALCOMM Incorporated, San Diego, CA (US)

(72) Inventors: Srujan Babu Nandipati, Bangalore (IN); Pushkar Gorur Sheshagiri, Bengaluru (IN); Ajit Deepak Gupte, Bangalore (IN); Gerhard Reitmayr, Del Mar, CA (US); Lakshmi Phalguni Kuchibhotla, Bengaluru (IN); Abhijeet Bisain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/937,631

(22) Filed: Nov. 5, 2024

(65) Prior Publication Data

US 2026/0126853 A1 May 7, 2026

(51) Int. Cl.
*G06F 3/01* (2006.01)
*G06T 7/70* (2017.01)

(52) U.S. Cl.
CPC ................ *G06F 3/012* (2013.01); *G06T 7/70* (2017.01)

(58) Field of Classification Search
CPC . G06T 7/70; G06F 3/013; G06F 3/012; G06F 3/011; G01C 25/00; G01C 21/1656; G01C 17/38
See application file for complete search history.

(56) References Cited

U.S. PATENT DOCUMENTS

| | | | | |
|---|---|---|---|---|
| 8,510,039 | B1 | 8/2013 | Troy et al. | |
| 10,444,030 | B1 | 10/2019 | Bogatsky et al. | |
| 2011/0218733 | A1 * | 9/2011 | Hamza ............... | G01C 21/3415 702/85 |
| 2012/0095643 | A1 * | 4/2012 | Bose ...................... | B60K 35/10 715/744 |
| 2013/0335562 | A1 | 12/2013 | Ramanandan et al. | |
| 2014/0150521 | A1 * | 6/2014 | Jacobson ............... | G01C 25/00 73/1.38 |

(Continued)

OTHER PUBLICATIONS

International Search Report and Written Opinion—PCT/US2025/053193—ISA/EPO—Mar. 5, 2026.

*Primary Examiner* — Mihir K Rayan
(74) *Attorney, Agent, or Firm* — QUALCOMM Incorporated

(57) ABSTRACT

Systems and techniques are described herein for determining pose information. For instance, a method for determining pose information is provided. The method may include determining a first pose of an apparatus using a first mode, wherein determining the first pose of the apparatus using the first mode includes processing first inertial-measurement unit (IMU) data; determining that the first IMU data satisfies a condition; responsive to determining that the first IMU data satisfies the condition, determining a second pose of the apparatus using a second mode, wherein determining the second pose of the apparatus using the second mode includes processing image data; determining an IMU bias based on the first pose and the second pose; and determining a third pose of the apparatus, wherein determining the third pose of the apparatus includes processing second IMU data based on the IMU bias.

20 Claims, 10 Drawing Sheets

(56) References Cited

U.S. PATENT DOCUMENTS

| | | | | |
|---|---|---|---|---|
| 2016/0271795 | A1* | 9/2016 | Vicenti | G05D 1/644 |
| 2018/0180443 | A1* | 6/2018 | Han | G01C 22/006 |
| 2020/0286257 | A1* | 9/2020 | Kitajima | G06T 7/73 |
| 2021/0109590 | A1* | 4/2021 | Gullicksen | G06T 7/73 |
| 2022/0348188 | A1* | 11/2022 | Green | G01C 9/00 |
| 2022/0413598 | A1 | 12/2022 | Holland et al. | |
| 2023/0011082 | A1 | 1/2023 | Erivantcev et al. | |
| 2023/0132644 | A1* | 5/2023 | Melim | G06N 20/00 345/156 |
| 2024/0176419 | A1 | 5/2024 | Zhang et al. | |
| 2026/0126853 | A1* | 5/2026 | Nandipati | G01C 21/1656 |

* cited by examiner

500

DETERMINING ORIENTATION INFORMATION

TECHNICAL FIELD

The present disclosure generally relates to determining orientation information. For example, aspects of the present disclosure include systems and techniques for determining an orientation of a device.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto a user's view of a real-world environment. For example, an XR head-mounted device (HMD) may include a display that allows a user to view the user's real-world environment through a display of the HMD (e.g., a transparent display). The XR HMD may display virtual content at the display in the user's field of view overlaying the user's view of their real-world environment. Such an implementation may be referred to as "see-through" XR. As another example, an XR HMD may include a scene-facing camera that may capture images of the user's real-world environment. The XR HMD may modify or augment the images (e.g., adding virtual content) and display the modified images to the user. Such an implementation may be referred to as "pass through" XR or as "video see through (VST)."

The user can generally change their view of the environment interactively, for example by tilting or moving the XR HMD. In order to render virtual content in an appropriate relationship to the real world as the user moves their head, an XR HMD may track an orientation and/or location of the XR HMD. For example, the XR HMD may include an inertial measurement unit that the XR HMD may use to track the orientation and/or location of the XR HMD over time.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for determining pose information. According to at least one example, a method is provided for determining pose information. The method includes: determining a first pose of an apparatus using a first mode, wherein determining the first pose of the apparatus using the first mode includes processing first inertial-measurement unit (IMU) data; determining that the first IMU data satisfies a condition; responsive to determining that the first IMU data satisfies the condition, determining a second pose of the apparatus using a second mode, wherein determining the second pose of the apparatus using the second mode includes processing image data; determining an IMU bias based on the first pose and the second pose; and determining a third pose of the apparatus, wherein determining the third pose of the apparatus includes processing second IMU data based on the IMU bias.

In another example, an apparatus for determining pose information is provided that includes at least one memory and at least one processor (e.g., configured in circuitry) coupled to the at least one memory. The at least one processor configured to: determine a first pose of an apparatus using a first mode, wherein determining the first pose of the apparatus using the first mode includes processing first inertial-measurement unit (IMU) data; determine that the first IMU data satisfies a condition; responsive to determining that the first IMU data satisfies the condition, determine a second pose of the apparatus using a second mode, wherein determining the second pose of the apparatus using the second mode includes processing image data; determine an IMU bias based on the first pose and the second pose; and determine a third pose of the apparatus, wherein determining the third pose of the apparatus includes processing second IMU data based on the IMU bias.

In another example, a non-transitory computer-readable medium is provided that has stored thereon instructions that, when executed by one or more processors, cause the one or more processors to: determine a first pose of an apparatus using a first mode, wherein determining the first pose of the apparatus using the first mode includes processing first inertial-measurement unit (IMU) data; determine that the first IMU data satisfies a condition; responsive to determining that the first IMU data satisfies the condition, determine a second pose of the apparatus using a second mode, wherein determining the second pose of the apparatus using the second mode includes processing image data; determine an IMU bias based on the first pose and the second pose; and determine a third pose of the apparatus, wherein determining the third pose of the apparatus includes processing second IMU data based on the IMU bias.

In another example, an apparatus for determining pose information is provided. The apparatus includes: means for determining a first pose of an apparatus using a first mode, wherein determining the first pose of the apparatus using the first mode includes processing first inertial-measurement unit (IMU) data; means for determining that the first IMU data satisfies a condition; means for responsive to determining that the first IMU data satisfies the condition, determining a second pose of the apparatus using a second mode, wherein determining the second pose of the apparatus using the second mode includes processing image data; means for determining an IMU bias based on the first pose and the second pose; and means for determining a third pose of the apparatus, wherein determining the third pose of the apparatus includes processing second IMU data based on the IMU bias.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
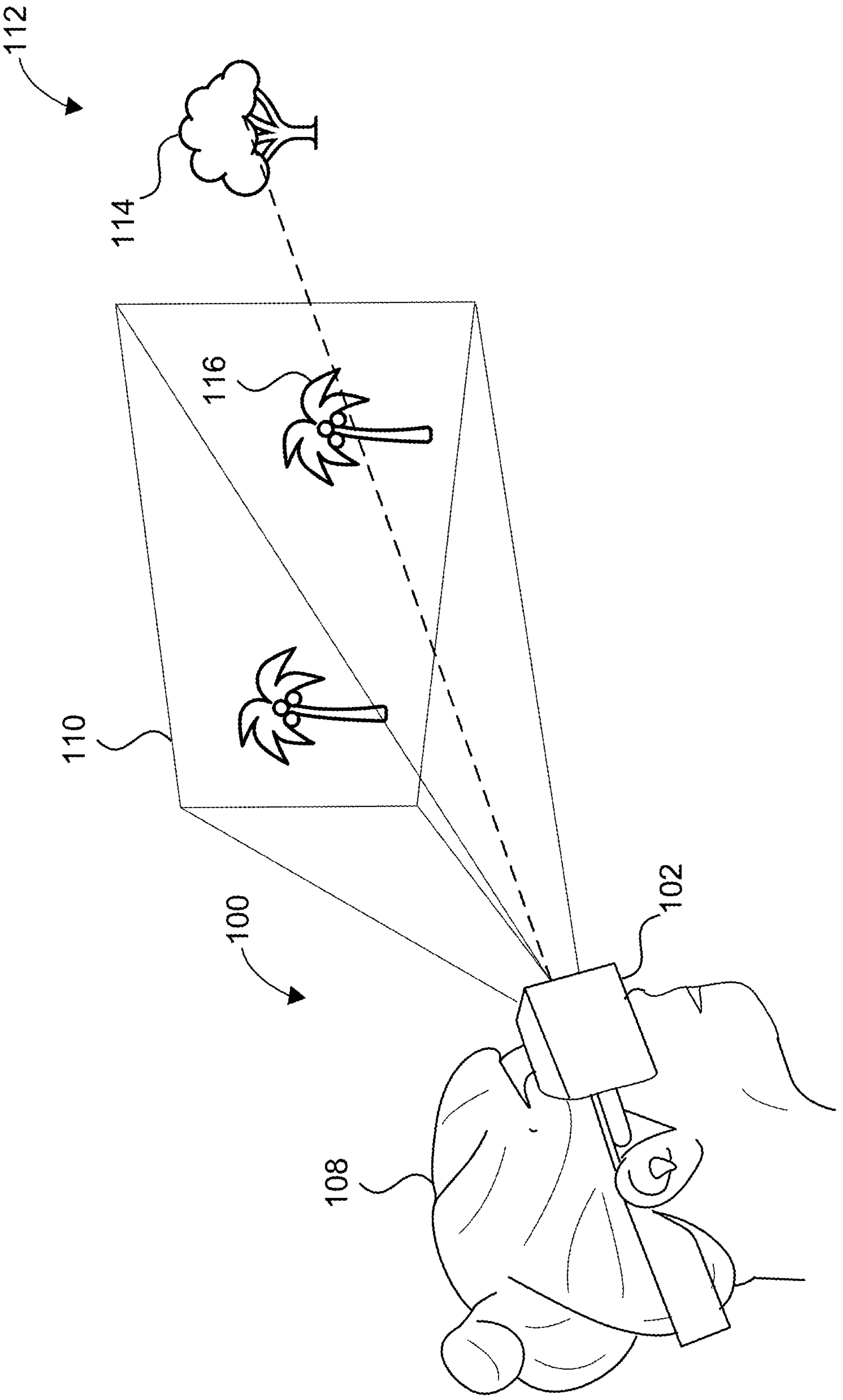
FIG. 1 is a diagram illustrating an example extended-reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs) (which may also be referred to as a head-mounted devices), XR glasses (e.g., AR glasses, MR glasses, etc.) (also referred to as smart or network-connected glasses), among others. In some cases, XR glasses are an example of an HMD. In some cases, an XR system can track parts of the user (e.g., a hand and/or fingertips of a user) to allow the user to interact with items of virtual content.

XR systems can include virtual reality (VR) systems facilitating interactions with VR environments, augmented reality (AR) systems facilitating interactions with AR environments, mixed reality (MR) systems facilitating interactions with MR environments, and/or other XR systems.

For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may virtually interact with other users (e.g., in a social setting, in a virtual meeting, etc.), virtually shop for items (e.g., goods, services, property, etc.), to play computer games, and/or to experience other services in a metaverse virtual environment. In one illustrative example, an XR system may provide a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

XR systems may track a pose (e.g., orientation and/or position) of a display of the XR system. Tracking the pose of the display may allow the XR system to display virtual content relative to the real world (e.g., to anchor virtual content to points in the real world).

In some cases, a display of an XR system (e.g., a head-mounted display (HMD), AR glasses, etc.) may include one or more inertial measurement units (IMUs) and may use measurements from the IMUs to track a pose of the display. For example, the XR system may assume an initial position of the display and track a position of the display based on acceleration measured by the IMUs. IMUs may include accelerometers, magnetometers, and/or gyroscope sensors (also referred to as gyroscopic sensors).

Additionally or alternatively, some XR systems may use visual simultaneous localization and mapping (VSLAM) (which may also be referred to as simultaneous localization and mapping (SLAM)) or other computational-geometry techniques to track a pose of an element (e.g., a display) of such XR systems. In VSLAM, a device can keep track of the device's pose within the environment based on tracking where objects in the environment appear in images captured by the device over time.

Degrees of freedom (DoF) refer to the number of basic ways a rigid object can move in three-dimensional (3D) space. In the context of systems that track movement through an environment, such as XR systems, degrees of freedom can refer to which of the six degrees of freedom the system is capable of tracking. For example, 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, can track the user moving forward, backward, laterally, and/or vertically in addition to tracking the three rotational DoF.

In the present disclosure, the terms "pose" and "pose information" may refer to the position and/or orientation of an object or device. For example, an XR system may determine (and/or track) a pose of a display of the XR system (e.g., using data from an IMU of the display and/or using images captured by a camera of the display, such as using a VSLAM technique). In determining the pose of the display, the XR system may determine the position (e.g., according to 3 positional DoF) and/or an orientation of the display (e.g., according to three rotational DoF).

There are use cases (e.g., related to multi-media consumption) that can be addressed using 3DOF solutions in XR. For example, a user may be seated and stationary and may watch virtual content (e.g., a movie) using an XR headset. The XR headset may anchor the virtual content to a wall. 3DOF solutions may give reliable orientation estimates over time. For example, an orientation can be estimated over time using data from a gyroscope (e.g., based on an initial attitude).

But orientation estimates may drift over time due to inaccurate gyro-biases and white noise. Similarly, 3DOF solutions based on data from accelerometer and gyroscopes drift about the direction of gravity.

Accurate estimates of biases may help in controlling the angular drift in 3DOF solutions. Accurate gyro bias estimates (e.g., estimates of a bias of a gyroscope sensor) can be used to reduce drift significantly. Gyro biases can be estimated by determining poses using both a computational-geometry technique (e.g., VSLAM) and an IMU-based technique.

Systems, apparatuses, methods (also referred to as processes), and computer-readable media (collectively referred to herein as "systems and techniques") are described herein for determining orientation data. For example, the systems and techniques described herein may calibrate IMUs of an apparatus by determining an IMU bias (e.g., when the apparatus is initialized, at intervals, and/or responsive to drift). For example, the systems and techniques may determine an IMU-based orientation of an apparatus based on inertial data from an IMU (e.g., a gyroscope, an accelerometer, and/or a magnetometer) of the apparatus. Further, the systems and techniques may determine an image-based orientation of the apparatus based on images captured by an image sensor of the apparatus (e.g., according to a computational-geometry techniques, such as VSLAM). The systems and techniques may determine an IMU bias based on the difference between the IMU-based orientation and the image-based orientation. For example, the systems and techniques may determine an amount of drift in measurements of the IMU and determine how to correct the drift, for example, on a per-measurement basis. For instance, the systems and techniques may use a Kalman filter to track an orientation of the apparatus and determine a bias of the IMUs based on the IMU-based orientation and the image-based orientation. After determining the IMU bias, the systems and techniques may track the orientation of the apparatus over time (e.g., using the Kalman filter) based on IMU data from the IMU and the IMU bias.

After determining the IMU bias, the systems and techniques may disable or bypass the VSLAM module and/or not determine additional image-based orientations but instead use inertial data to determine IMU-based orientations. Using the IMU to determine IMU-based orientations (and not using images to determine image-based orientations) may conserve computational resources (e.g., power, processing bandwidth, etc.).

In some cases, at intervals, the systems and techniques may capture images and determine updated image-based orientations. The systems and techniques may use the updated image-based orientations to update the IMU bias. Thereafter, for a time, the systems and techniques may continue to determine IMU-based orientations based on the updated IMU bias (e.g., without using additional image data).

Additionally or alternatively, the systems and techniques may update the IMU bias in response to certain conditions. For example, if the systems and techniques determine that one or more of the IMUs has drifted, the systems and techniques may capture images, determine an image-based orientation, and determine an updated IMU bias. For example, if the dip angle estimate deviates from reference dip angle, system and techniques may determine to update a bias for magnetometer. For example, magnetometer-IMU 3DOF solutions may be affected by strong magnetic disturbances in the vicinity. The systems and techniques may detect strong magnetic disturbances and enable a computational-geometry technique (e.g., VSLAM) for short durations when strong magnetic disturbance is detected. The systems and techniques may determine that the IMU is affected by a magnetic disturbance by using an estimate of magnetic dip angle and magnitude of magnetic measurements.

Acceleration-IMU 3DOF solutions may be affected by continuous linear acceleration on the IMU. The systems and techniques may detect continuous linear acceleration and enable a computational-geometry technique for short durations when the continuous linear acceleration is detected. The systems and techniques may detect continuous linear acceleration based on accelerometer-measurement norms deviating significantly from gravity (e.g., 9.8 meters/second/second).

Additionally or alternatively, if the systems and techniques determine that a covariance determined by the Kalman filter exceeds a covariance threshold, the systems and techniques may determine to update an IMU bias (e.g., a bias for a gyroscope). For example, 3DOF solutions may maintain an error covariance of estimates. The systems and techniques may enable a computational-geometry technique for a short duration when an error covariance grows beyond a tolerable angular drift.

In some aspects, the systems and techniques may store an IMU bias for future "warm starts" of the apparatus. For example, the systems and techniques may store an IMU bias when an apparatus is powered off such that the stored IMU bias can be used the next time the apparatus is powered on, the device may initialize the IMU-based orientation determination with the stored IMU bias.

The systems and techniques may run a computational-geometry technique (e.g., VSLAM) for short durations when an apparatus is initialized, at intervals, and/or when challenging scenarios are encountered. The computational-geometry technique may provide reliable attitude information and/or gyro biases. The systems and techniques may use updated attitude information and/or gyro biases along with IMU-based orientation-determination techniques to improve the quality of orientation estimates.

Running a computational-geometry technique for short durations in the presence of magnetic disturbances can further help avoid heading drift. Using IMU-based orientation-determination techniques, using magnetometers affected with disturbances will shift the heading (north) by few degrees depending on the disturbance. Disturbances often appear as an offset. The systems and techniques activating a computational-geometry technique when magnetic disturbance is detected may help estimate the disturbance/offset. The offset may be accounted in a 3DoF Kalman filter so that, the systems and techniques can continue using the magnetometer without any significant impact on heading estimation accuracy.

Most 3DOF attitude and heading reference system (AHRS) methods estimate biases online using IMU data only. IMU Biases estimated based on computational-geometry technique are accurate and using these biases in 3DOF can control drift significantly.

The systems and techniques may include using a computational-geometry technique for short durations to get accurate bias estimates. For example, the systems and techniques may use a computational-geometry technique when a 3DOF solution is uncertain. The systems and techniques include methods to identify when a 3DOF solution is uncertain/inaccurate.

By using a computational-geometry technique for short durations, as compared with using the computational-geometry technique continuously, the systems and techniques may conserve computational resources.

Additionally, power can be further reduced by making frame-capture rate of a camera proportional to angular velocity of the apparatus for which the orientation is being determined. Changing the frame-capture rate in this way may not affect quality of computational-geometry technique because stable (non-moving) frames may not indicate a change in orientation and may thus be redundant. The computational-geometry technique may operate just as well to determine the orientation of the device without the redundant frames.

Various aspects of the application will be described with respect to the figures below.

FIG. 1 is a diagram illustrating an example extended-reality (XR) system 100, according to aspects of the disclosure. As shown, XR system 100 includes an XR device 102. XR device 102 may implement, as examples, image-capture, object-detection, object-tracking, gaze-tracking, view-tracking, localization (e.g., determining a location of XR device 102), pose-tracking (e.g., tracking a pose of XR device 102 and/or a pose of one or more objects in scene 112), content-generation, content-rendering, computational, communicational, and/or display aspects of extended reality, including virtual reality (VR), augmented reality (AR), and/or mixed reality (MR).

For example, XR device 102 may include one or more scene-facing cameras that may capture images of a scene 112 in which a user 108 uses XR device 102. XR device 102 may detect and/or track objects (e.g., object 114) in scene 112 based on the images of scene 112. In some aspects, XR device 102 may include one or more user-facing cameras that may capture images of eyes of user 108. XR device 102 may determine a gaze of user 108 based on the images of user 108. In some aspects, XR device 102 may determine an object of interest (e.g., object 114) in scene 112 (e.g., based on the gaze of user 108, based on object recognition, and/or based on a received indication regarding object 114). XR device 102 may obtain and/or render XR content 116 (e.g., text, images, and/or video) for display at XR device 102. XR device 102 may display XR content 116 to user 108 (e.g., within a field of view 110 of user 108). In some aspects, XR content 116 may be based on and/or anchored to points in scene 112. For example, XR content 116 may be, or may include, an altered version of object 114 (e.g., based on an XR application running at XR device 102) anchored to object 114 in scene 112. The XR application may provide user 108 with an XR experience by altering scene 112 in view 110 of user 108. In some aspects, XR device 102 may display XR content 116 in relation to the view of user 108 of the object of interest. For example, XR device 102 may overlay XR content 116 onto object 114 in field of view 110. In any case, XR device 102 may overlay XR content 116 (whether related to object 114 or not) onto the view of user 108 of scene 112. For example, object 114 may be a cherry tree. Based on an XR application running at XR device 102, XR device 102 may anchor XR content 116, which may be a palm tree, to object 114 such that in the view user 108, user 108 sees XR content 116 (the palm tree) and not object 114 (the cherry tree).

In a "see-through" or "transparent" configuration, XR device 102 may include a transparent surface (e.g., optical glass) such that XR content 116 may be displayed on (e.g., by being projected onto) the transparent surface to overlay the view of user 108 of scene 112 as viewed through the transparent surface. In a "pass-through" configuration or a "video see-through" configuration, XR device 102 may include a scene-facing camera that may capture images of scene 112. XR device 102 may display images or video of scene 112, as captured by the scene-facing camera, and XR content 116 overlaid on the images or video of scene 112.

In various examples, XR device 102 may be, or may include, a head-mounted device (HMD), a virtual reality headset, and/or smart glasses. XR device 102 may include one or more cameras, including scene-facing cameras and/or user-facing cameras, a GPU, one or more sensors (e.g., such as one or more inertial measurement units (IMUs), image sensors, and/or microphones), one or more communication units (e.g., wireless communication units), and/or one or more output devices (e.g., such as speakers, headphones, display, and/or smart glass).

In some aspects, XR device 102 may be, or may include, two or more devices. For example, XR device 102 may include a display device and a processing device. The display device may capture and/or generate data, such as image data (e.g., from user-facing cameras and/or scene-facing cameras) and/or motion data (from an inertial measurement unit (IMU)). The display device may provide the data to the processing device, for example, through a wireless connection between the display device and the processing device. The processing device may process the data and/or other data (e.g., data received from another source). Further, the processing unit may generate (or obtain) XR content 116 to be displayed at the display device. The processing device may provide the generated XR content 116 to the display device, for example, through the wireless connection. And the display device may display XR content 116 in field of view 110 of user 108.

Figure 2:
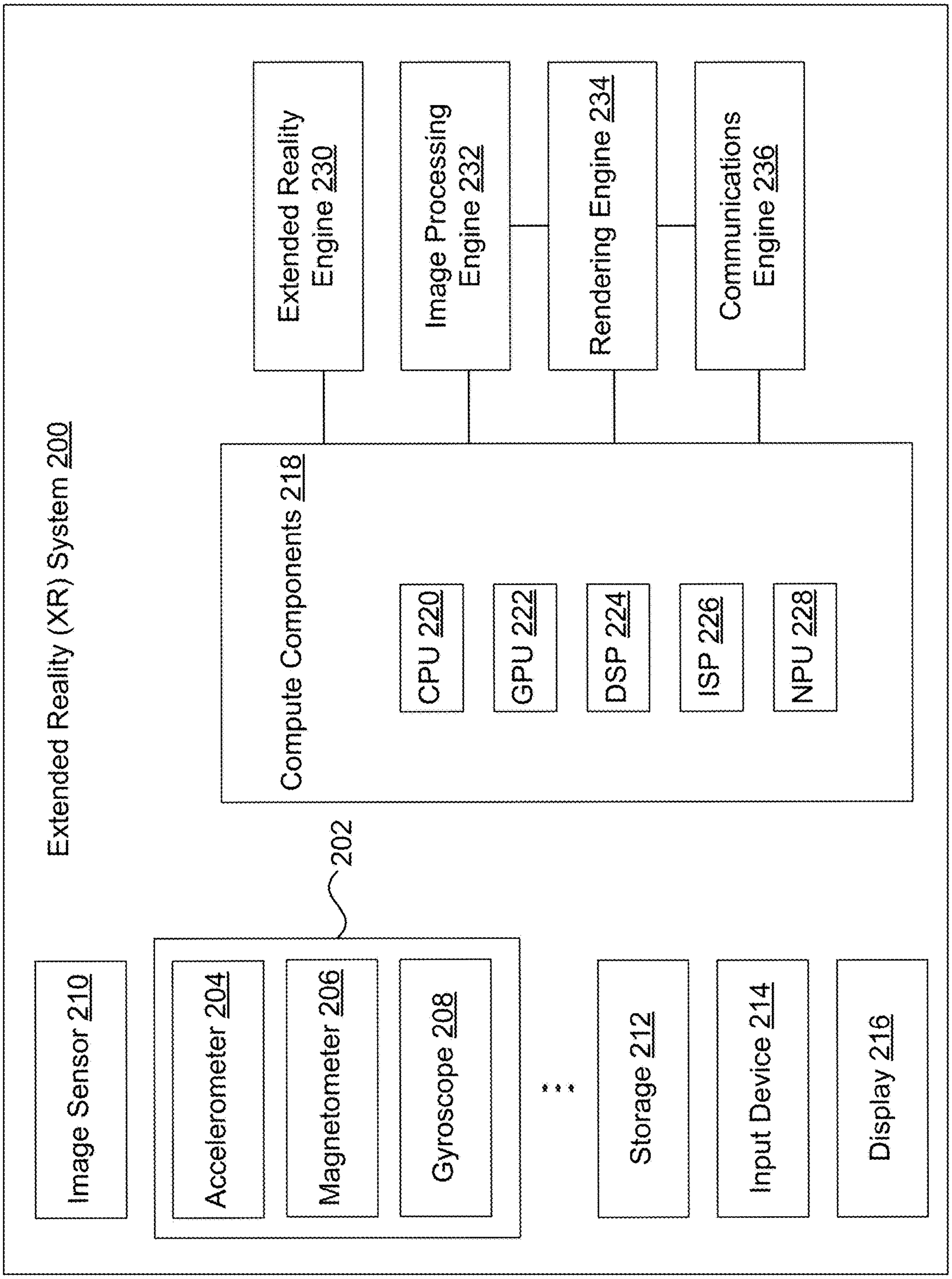
FIG. 2 is a block diagram illustrating an architecture of an example XR system, in accordance with some aspects of the disclosure.

FIG. 2 is a diagram illustrating an architecture of an example extended reality (XR) system 200, in accordance with some aspects of the disclosure. XR system 200 may execute XR applications and implement XR operations.

In this illustrative example, XR system 200 includes an accelerometer 204, a gyroscope 208, a magnetometer 206, (which may be included in a inertial measurement unit (IMU) 202), one or more image sensors 210, storage 212, an input device 214, a display 216, Compute components 218, an XR engine 230, an image processing engine 232, a rendering engine 234, and a communications engine 236. It should be noted that the components 210-236 shown in FIG. 2 are non-limiting examples provided for illustrative and explanation purposes, and other examples may include more, fewer, or different components than those shown in FIG. 2. For example, in some cases, XR system 200 may include one or more other sensors (e.g., one or more light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2.

While various components of XR system 200, such as image sensor 210, may be referenced in the singular form herein, it should be understood that XR system 200 may include multiple of any component discussed herein (e.g., multiple image sensors 210).

Display 216 may be, or may include, a glass, a screen, a lens, a projector, and/or other display mechanism that allows a user to see the real-world environment and also allows XR content to be overlaid, overlapped, blended with, or otherwise displayed thereon.

XR system 200 may include, or may be in communication with, (wired or wirelessly) an input device 214. Input device 214 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 210 may capture images that may be processed for interpreting gesture commands.

XR system 200 may also communicate with one or more other electronic devices (wired or wirelessly). For example, communications engine 236 may be configured to manage connections and communicate with one or more electronic devices. In some cases, communications engine 236 may correspond to communication interface 1026 of FIG. 10.

In some implementations, image sensors 210, accelerometer 204, gyroscope 208, magnetometer 206, storage 212, display 216, compute components 218, XR engine 230, image processing engine 232, and rendering engine 234 may be part of the same computing device. For example, in some cases, image sensors 210, accelerometer 204, gyroscope 208, magnetometer 206, storage 212, display 216, compute components 218, XR engine 230, image processing engine 232, and rendering engine 234 may be integrated into an HMD, extended reality glasses, smartphone, laptop, tablet computer, gaming system, and/or any other computing device. However, in some implementations, image sensors 210, accelerometer 204, gyroscope 208, magnetometer 206, storage 212, display 216, compute components 218, XR engine 230, image processing engine 232, and rendering engine 234 may be part of two or more separate computing devices. For instance, in some cases, some of the components 210-236 may be part of, or implemented by, one computing device and the remaining components may be part of, or implemented by, one or more other computing devices. For example, such as in a split perception XR system, XR system 200 may include a first device (e.g., an HMD), including display 216, image sensor 210, accelerometer 204, gyroscope 208, magnetometer 206, and/or one or more compute components 218. XR system 200 may also include a second device including additional compute components 218 (e.g., implementing XR engine 230, image processing engine 232, rendering engine 234, and/or communications engine 236). In such an example, the second device may generate virtual content based on information or data (e.g., images, sensor data such as measurements from accelerometer 204 and gyroscope 208) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 212 may be any storage device(s) for storing data. Moreover, storage 212 may store data from any of the components of XR system 200. For example, storage 212 may store data from image sensor 210 (e.g., image or video data), inertial data from IMU 202 (which may include data from accelerometer 204 (e.g., acceleration measurements), data from gyroscope 208 (e.g., orientation and/or angular velocity measurements), data from magnetometer 206 (e.g., magnetic-field measurements)), data from compute components 218 (e.g., processing parameters, preferences, virtual content, rendering content, scene maps, tracking and localization data, object detection data, privacy data, XR application data, face recognition data, occlusion data, etc.), data from XR engine 230, data from image processing engine 232, and/or data from rendering engine 234 (e.g., output frames). In some examples, storage 212 may include a buffer for storing frames for processing by compute components 218.

Compute components 218 may be, or may include, a central processing unit (CPU) 220, a graphics processing unit (GPU) 222, a digital signal processor (DSP) 224, an image signal processor (ISP) 226, a neural processing unit (NPU) 228, which may implement one or more trained neural networks, and/or other processors. Compute components 218 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 218 may implement (e.g., control, operate, etc.) XR engine 230, image processing engine 232, and rendering engine 234. In other examples, compute components 218 may also implement one or more other processing engines.

Image sensor 210 may include any image and/or video sensors or capturing devices. In some examples, image sensor 210 may be part of a multiple-camera assembly, such as a dual-camera assembly. Image sensor 210 may capture image and/or video content (e.g., raw image and/or video data), which may then be processed by compute components 218, XR engine 230, image processing engine 232, and/or rendering engine 234 as described herein.

In some examples, image sensor 210 may capture image data and may generate images (also referred to as frames) based on the image data and/or may provide the image data or frames to XR engine 230, image processing engine 232, and/or rendering engine 234 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 210 (and/or other camera of XR system 200) may be configured to also capture depth information. For example, in some implementations, image sensor 210 (and/or other camera) may include an RGB-depth (RGB-D) camera. In some cases, XR system 200 may include one or more depth sensors (not shown) that are separate from image sensor 210 (and/or other camera) and that may capture depth information. For instance, such a depth sensor may obtain depth information independently from image sensor 210. In some examples, a depth sensor may be physically installed in the same general location or position as image sensor 210 but may operate at a different frequency or frame rate from image sensor 210. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 200 may also include other sensors in its one or more sensors. The one or more sensors may include one or more accelerometers (e.g., accelerometer 204), one or more gyroscopes (e.g., gyroscope 208), one or more magnetometers (e.g., magnetometer 206), one or more IMUs (e.g., IMU 202) and/or other sensors. The one or more sensors may provide acceleration, velocity, orientation, and/or other position-related information to compute components 218. For example, accelerometer 204 may detect acceleration by XR system 200 and may generate acceleration measurements based on the detected acceleration. In some cases, accelerometer 204 may provide one or more translational vectors (e.g., up/down, left/right, forward/back) that may be used for determining a position or pose of XR system 200. Gyroscope 208 may detect and measure the orientation and angular velocity of XR system 200. For example, gyroscope 208 may be used to measure the pitch, roll, and yaw of XR system 200. In some cases, gyroscope 208 may provide one or more rotational vectors (e.g., pitch, yaw, roll). Magnetometer 206 may detect and measure strength, direction, and/or change in magnetic fields. Data from magnetometer 206 may be used to determine position and/or orientation data of XR system 200. In some examples, image sensor 210 and/or XR engine 230 may use measurements obtained by IMU 202 (e.g., inertial data), accelerometer 204 (e.g., one or more translational vectors), gyroscope 208 (e.g., one or more rotational vectors), and/or magnetometer 206 (e.g., magnetic-field data) to calculate the pose of XR system 200. As previously noted, in other examples, XR system 200 may also include other sensors such as a gaze and/or eye tracking sensor, a machine vision sensor, a smart scene sensor, a speech recognition sensor, an impact sensor, a shock sensor, a position sensor, a tilt sensor, etc.

In some cases, the one or more sensors may include at least one IMU (e.g., in addition to IMU 202). An IMU (e.g., IMU 202) is an electronic device that measures the specific force, angular rate, and/or the orientation of XR system 200, using a combination of one or more accelerometers, one or more gyroscopes, and/or one or more magnetometers. In some examples, the one or more sensors may output measured information associated with the capture of an image captured by image sensor 210 (and/or other camera of XR system 200) and/or depth information obtained using one or more depth sensors of XR system 200.

The output of one or more sensors (e.g., accelerometer 204, gyroscope 208, magnetometer 206, IMU 202, one or more IMUs, and/or other sensors) can be used by XR engine 230 to determine a pose of XR system 200 (also referred to as the head pose) and/or the pose of image sensor 210 (or other camera of XR system 200). In some cases, the pose of XR system 200 and the pose of image sensor 210 (or other camera) can be the same. The pose of image sensor 210 refers to the position and orientation of image sensor 210 relative to a frame of reference (e.g., with respect to a field of view 110 of FIG. 1). In some implementations, the camera pose can be determined for 6-Degrees of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees of Freedom (3DoF), which refers to the three angular components (e.g., roll, pitch, and yaw).

In some cases, a device tracker (not shown) can use the measurements from the one or more sensors and image data from image sensor 210 to track a pose (e.g., a 6DoF pose) and/or orientation (3DoF) of XR system 200. For example, the device tracker can fuse visual data (e.g., using a visual tracking solution) from the image data with inertial data from the measurements to determine a position and motion of XR system 200 relative to the physical world (e.g., the scene) and a map of the physical world. As described below, in some examples, when tracking the pose of XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 200 within the scene and the 3D map of the scene, etc. The 3D map can provide a digital representation of a scene in the real/physical world. In some examples, the 3D map can anchor position-based objects and/or content to real-world coordinates and/or objects. XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 210 and/or XR system 200 as a whole can be determined and/or tracked by compute components 218 using a visual tracking solution based on images captured by image sensor 210 (and/or other camera of XR system 200). For instance, in some examples, compute components 218 can perform tracking using computer vision-based tracking, model-based tracking, and/or simultaneous localization and mapping (SLAM) techniques. For instance, compute components 218 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 210) and/or XR system 200 relative to that map. The map can be referred to as a SLAM map which can be three-dimensional (3D). The SLAM techniques can be performed using color or grayscale image data captured by image sensor 210 (and/or other camera of XR system 200) and can be used to generate estimates of 6DoF pose measurements of image sensor 210 and/or XR system 200. Such a SLAM technique configured to perform 6DoF tracking can be referred to as 6DoF SLAM. In some cases, the output of the one or more sensors (e.g., accelerometer 204, gyroscope 208, magnetometer 206, IMU 202, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 210 (and/or other camera) to the SLAM map. For example, 6DoF SLAM can use feature point associations from an input image to determine the pose (position and orientation) of the image sensor 210 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 210 and/or the XR system 200 can be determined by projecting features from the 3D SLAM map into an image or video frame and updating the camera pose from verified 2D-3D correspondences.

In one illustrative example, the compute components 218 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 218 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
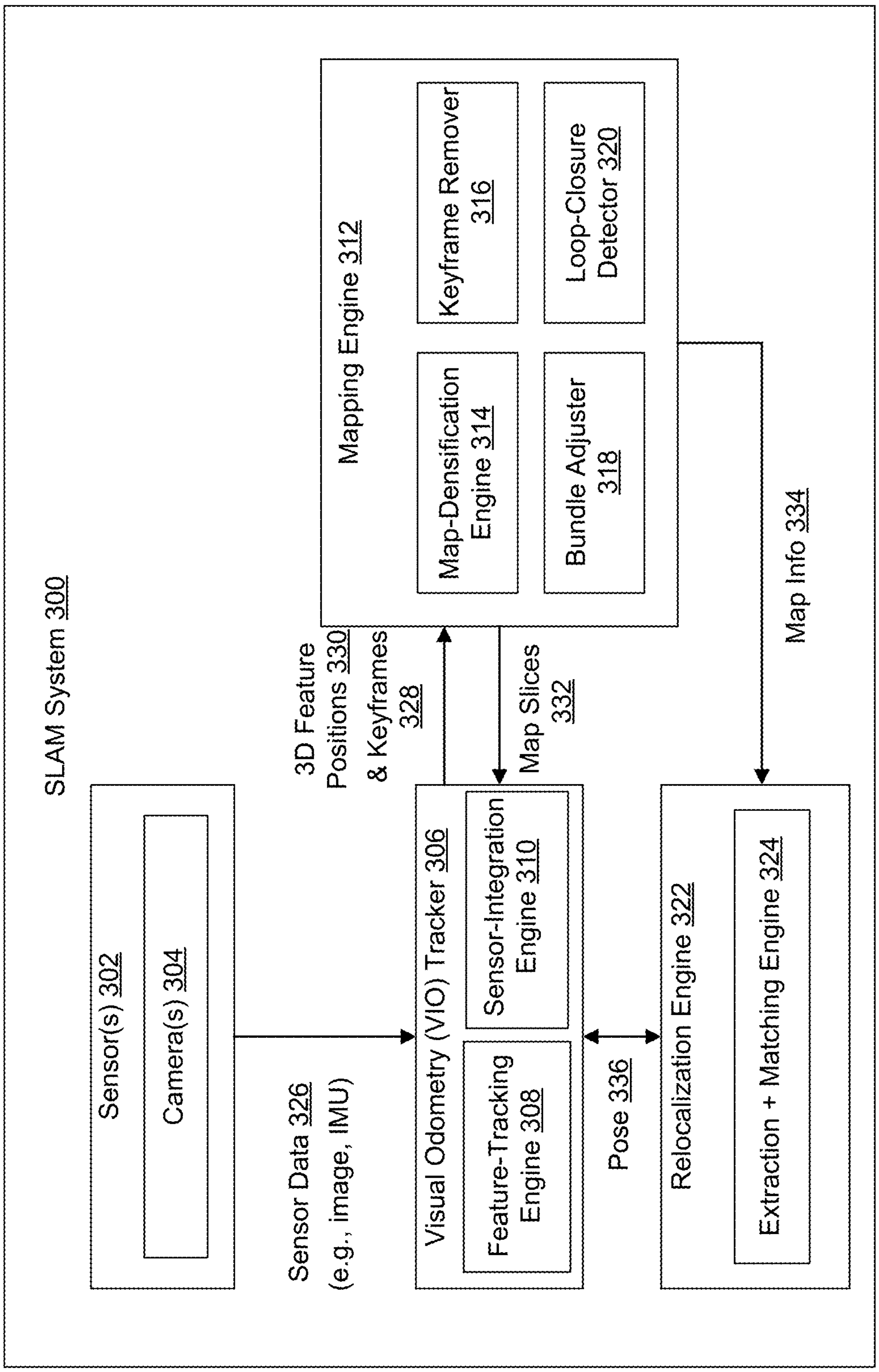
FIG. 3 is a block diagram illustrating an architecture of a simultaneous localization and mapping (SLAM) system, according to various aspects of the present disclosure.

FIG. 3 is a block diagram illustrating an architecture of a simultaneous localization and mapping (SLAM) system 300, according to various aspects of the present disclosure. In some aspects, SLAM system 300 can be, or can include, a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

SLAM system 300 of FIG. 3 includes, or is coupled to, one or more sensor(s) 302. Sensor(s) 302 can include one or more camera(s) 304. Each of camera(s) 304 may be responsive to light from a particular spectrum of light. The spectrum of light may be a subset of the electromagnetic (EM) spectrum. For example, each of camera(s) 304 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or some combination thereof.

Sensor(s) 302 can include one or more other types of sensors other than camera(s) 304, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof.

SLAM system 300 includes a visual-inertial odometry (VIO) tracker 306. The term visual-inertial odometry may also be referred to herein as visual odometry. VIO tracker 306 receives sensor data 326 from sensor(s) 302. For instance, sensor data 326 can include one or more images captured by camera(s) 304. Sensor data 326 can include other types of sensor data from camera(s) 304, such as data from any of the types of camera(s) 304 listed herein. For instance, sensor data 326 can include inertial measurement unit (IMU) data from one or more IMUs of camera(s) 304.

Upon receipt of sensor data 326 from sensor(s) 302, VIO tracker 306 performs feature detection, extraction, and/or tracking using a feature-tracking engine 308 of VIO tracker 306. For instance, where sensor data 326 includes one or more images captured by camera(s) 304 of SLAM system 300, VIO tracker 306 can identify, detect, and/or extract features in each image. Features may include visually distinctive points in an image, such as portions of the image depicting edges and/or corners. VIO tracker 306 can receive sensor data 326 periodically and/or continually from sensor (s) 302, for instance by continuing to receive more images from camera(s) 304 as camera(s) 304 capture a video, where the images are video frames of the video. VIO tracker 306 can generate descriptors for the features. Feature descriptors can be generated at least in part by generating a description of the feature as depicted in a local image patch extracted around the feature. In some examples, a feature descriptor can describe a feature as a collection of one or more feature vectors. VIO tracker 306, in some cases with mapping engine 312 and/or relocalization engine 322, can associate the plurality of features with a map of the environment based on such feature descriptors. Feature-tracking engine 308 of VIO tracker 306 can perform feature tracking by recognizing features in each image that VIO tracker 306 already previously recognized in one or more previous images, in some cases based on identifying features with matching feature descriptors in different images. Feature-tracking engine 308 can track changes in one or more positions at which the feature is depicted in each of the different images. For example, the feature extraction engine can detect a particular corner of a room depicted in a left side of a first image captured by a first camera of camera(s) 304. Feature-tracking engine 308 can detect the same feature (e.g., the same particular corner of the same room) depicted in a right side of a second image captured by the first camera. Feature-tracking engine 308 can recognize that the features detected in the first image and the second image are two depictions of the same feature (e.g., the same particular corner of the same room), and that the feature appears in two different positions in the two images. VIO tracker 306 can determine, based on the same feature appearing on the left side of the first image and on the right side of the second image that the first camera has moved, for example if the feature (e.g., the particular corner of the room) depicts a static portion of the environment.

VIO tracker 306 can include a sensor-integration engine 310. Sensor-integration engine 310 can use sensor data from other types of sensor(s) 302 (other than camera(s) 304) to determine information that can be used by feature-tracking engine 308 when performing the feature tracking. For example, sensor-integration engine 310 can receive IMU data (e.g., which can be included as part of sensor data 326) from an IMU of sensor(s) 302. Sensor-integration engine 310 can determine, based on the IMU data in sensor data 326, that SLAM system 300 has rotated 15 degrees in a clockwise direction from acquisition or capture of a first image and capture to acquisition or capture of the second image by a first camera of camera(s) 304. Based on this determination, sensor-integration engine 310 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). Feature-tracking engine 308 can take this expectation into consideration in tracking features between the first image and the second image.

Based on the feature tracking by feature-tracking engine 308 and/or the sensor integration by sensor-integration engine 310, VIO tracker 306 can determine a 3D feature positions 330 of a particular feature. 3D feature positions 330 can include one or more 3D feature positions and can also be referred to as 3D feature points. 3D feature positions 330 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. VIO tracker 306 can also determine one or more keyframes 328 (referred to hereinafter as keyframes 328) corresponding to the particular feature. A keyframe (from one or more keyframes 328) corresponding to a particular feature may be an image in which the particular feature is clearly depicted. In some examples, a keyframe (from the one or more keyframes 328) corresponding to a particular feature may be an image in which the particular feature is clearly depicted. In some examples, a keyframe corresponding to a particular feature may be an image that reduces uncertainty in 3D feature positions 330 of the particular feature when considered by feature-tracking engine 308 and/or sensor-integration engine 310 for determination of 3D feature positions 330. In some examples, a keyframe corresponding to a particular feature also includes data associated with pose 336 of SLAM system 300 and/or camera(s) 304 during capture of the keyframe. In some examples, VIO tracker 306 can send 3D feature positions 330 and/or keyframes 328 corresponding to one or more features to mapping engine 312. In some examples, VIO tracker 306 can receive map slices 332 from mapping engine 312. VIO tracker 306 can feature information within map slices 332 for feature tracking using feature-tracking engine 308.

Based on the feature tracking by feature-tracking engine 308 and/or the sensor integration by sensor-integration engine 310, VIO tracker 306 can determine a pose 336 of SLAM system 300 and/or of camera(s) 304 during capture of each of the images in sensor data 326. Pose 336 can include a location of SLAM system 300 and/or of camera(s) 304 in 3D space, such as a set of coordinates along three different axes that are perpendicular to one another (e.g., an X coordinate, a Y coordinate, and a Z coordinate). Pose 336 can include an orientation of SLAM system 300 and/or of camera(s) 304 in 3D space, such as pitch, roll, yaw, or some combination thereof. In some examples, VIO tracker 306 can send pose 336 to relocalization engine 322. In some examples, VIO tracker 306 can receive pose 336 from relocalization engine 322.

SLAM system 300 also includes a mapping engine 312. Mapping engine 312 generates a 3D map of the environment based on 3D feature positions 330 and/or keyframes 328 received from VIO tracker 306. Mapping engine 312 can include a map-densification engine 314, a keyframe remover 316, a bundle adjuster 318, and/or a loop-closure detector 320. Map-densification engine 314 can perform map densification, in some examples, increase the quantity and/or density of 3D coordinates describing the map geometry. Keyframe remover 316 can remove keyframes, and/or in some cases add keyframes. In some examples, keyframe remover 316 can remove keyframes 328 corresponding to a region of the map that is to be updated and/or whose corresponding confidence values are low. Bundle adjuster 318 can, in some examples, refine the 3D coordinates describing the scene geometry, parameters of relative motion, and/or optical characteristics of the image sensor used to generate the frames, according to an optimality criterion involving the corresponding image projections of all points. Loop-closure detector 320 can recognize when SLAM system 300 has returned to a previously mapped region and can use such information to update a map slice and/or reduce the uncertainty in certain 3D feature points or other points in the map geometry. Mapping engine 312 can output map slices 332 to VIO tracker 306. Map slices 332 can represent 3D portions or subsets of the map. Map slices 332 can include map slices 332 that represent new, previously-unmapped areas of the map. Map slices 332 can include map slices 332 that represent updates (or modifications or revisions) to previously-mapped areas of the map. Mapping engine 312 can output map information 334 to relocalization engine 322. Map information 334 can include at least a portion of the map generated by mapping engine 312. Map information 334 can include one or more 3D points making up the geometry of the map, such as one or more 3D feature positions 330. Map information 334 can include one or more keyframes 328 corresponding to certain features and certain 3D feature positions 330.

SLAM system 300 also includes a relocalization engine 322. Relocalization engine 322 can perform relocalization, for instance when VIO tracker 306 fail to recognize more than a threshold number of features in an image, and/or VIO tracker 306 loses track of pose 336 of SLAM system 300 within the map generated by mapping engine 312. Relocalization engine 322 can perform relocalization by performing extraction and matching using an extraction and matching engine 324. For instance, extraction and matching engine 324 can by extract features from an image captured by camera(s) 304 of SLAM system 300 while SLAM system 300 is at a current pose 336 and can match the extracted features to features depicted in different keyframes 328, identified by 3D feature positions 330, and/or identified in map information 334. By matching these extracted features to the previously-identified features, relocalization engine 322 can identify that pose 336 of SLAM system 300 is a pose 336 at which the previously-identified features are visible to camera(s) 304 of SLAM system 300, and is therefore similar to one or more previous poses 336 at which the previously-identified features were visible to camera(s) 304. In some cases, relocalization engine 322 can perform relocalization based on wide baseline mapping, or a distance between a current camera position and camera position at which feature was originally captured. Relocalization engine 322 can receive information for pose 336 from VIO tracker 306, for instance regarding one or more recent poses of SLAM system 300 and/or camera(s) 304 which relocalization engine 322 can base its relocalization determination on. Once relocalization engine 322 relocates SLAM system 300 and/or camera(s) 304 and thus determines pose 336, relocalization engine 322 can output pose 336 to VIO tracker 306.

In some examples, VIO tracker 306 can modify the image in sensor data 326 before performing feature detection, extraction, and/or tracking on the modified image. For example, VIO tracker 306 can rescale and/or resample the image. In some examples, rescaling and/or resampling the image can include downscaling, downsampling, subscaling, and/or subsampling the image one or more times. In some examples, VIO tracker 306 modifying the image can include converting the image from color to greyscale, or from color to black and white, for instance by desaturating color in the image, stripping out certain color channel(s), decreasing color depth in the image, replacing colors in the image, or a combination thereof. In some examples, VIO tracker 306 modifying the image can include VIO tracker 306 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of camera(s) 304, such as a reflective surface, a prism, or a specular surface that reflects, refracts, and/or scatters light in different ways depending on the position of camera(s) 304 relative to the dynamic object. VIO tracker 306 can detect the dynamic objects using facial detection, facial recognition, facial tracking, object detection, object recognition, object tracking, or a combination thereof. VIO tracker 306 can detect the dynamic objects using one or more artificial intelligence algorithms, one or more trained machine learning models, one or more trained neural networks, or a combination thereof. VIO tracker 306 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4:
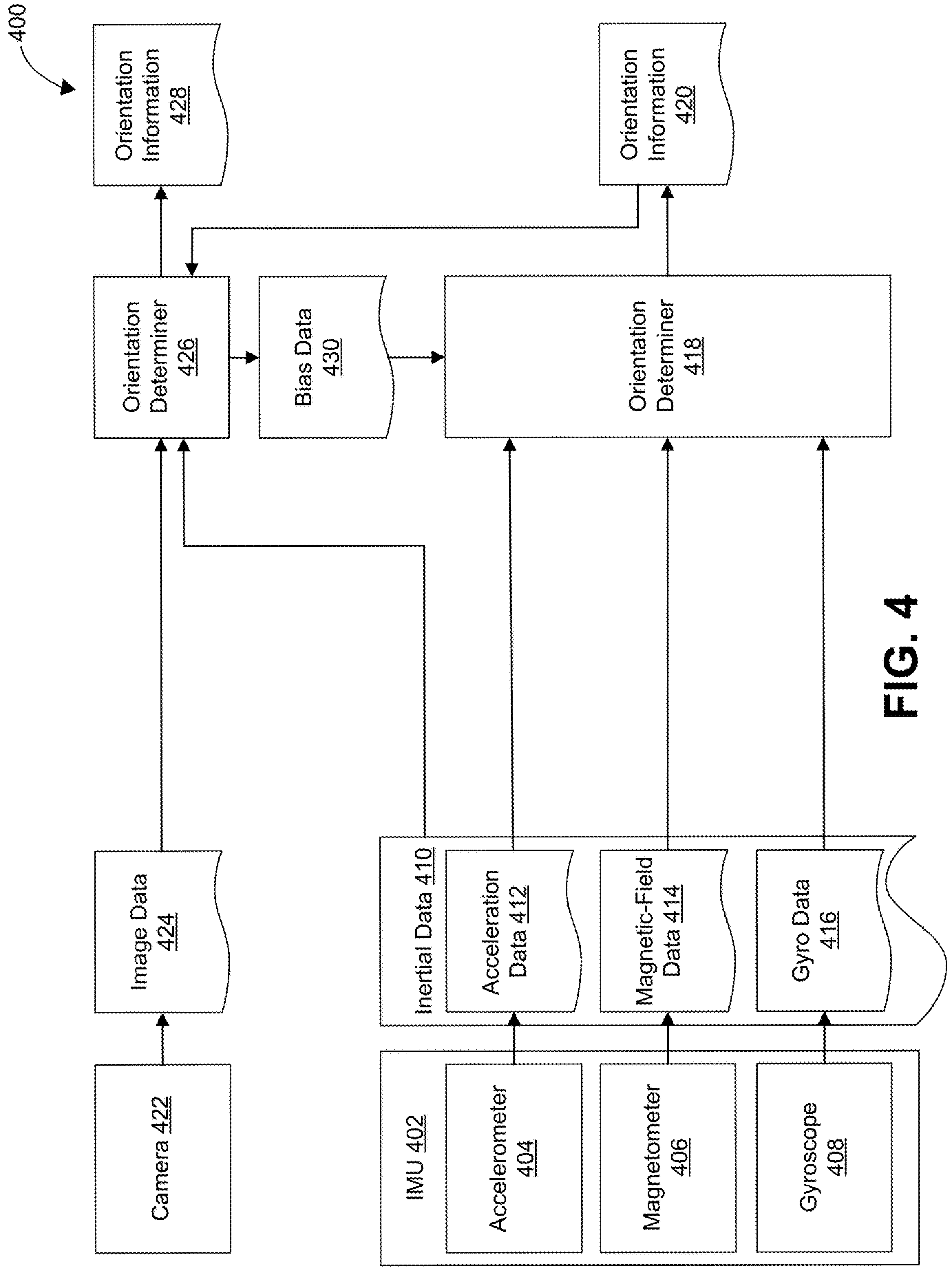
FIG. 4 is a block diagram illustrating an example system for generating orientation information, according to various aspects of the present disclosure.

FIG. 4 is a block diagram illustrating an example system 400 for generating orientation information 420, according to various aspects of the present disclosure. In general, an IMU 402 (which may be, or may include, one or more of each of accelerometer 404, magnetometer 406, and/or gyroscope 408) may generate inertial data 410 (which may include acceleration data 412, magnetic-field data 414, and/or gyro data 416). IMU 402 may provide inertial data 410 to orientation determiner 418. orientation determiner 418 may determine orientation information 420 based on inertial data 410. Additionally, a camera 422 may generate image data 424 and provide image data 424 to orientation determiner 426. Orientation determiner 426 may generate orientation information 428 based on image data 424. Additionally, orientation determiner 426 may generate bias data 430 based on image data 424 and orientation information 420 and provide bias data 430 to orientation determiner 418. Orientation determiner 418 may generate orientation information 420 based on inertial data 410 and bias data 430.

System 400 may be implemented in a head-mounted device (HMD). System 400 may be implemented in an XR system, such as XR system 100 of FIG. 1 and/or XR system 200 of FIG. 2.

IMU 402 may be, or may include, one or more sensors configured to determine inertial data 410. IMU 402 may be the same as, may be substantially similar to, and/or may perform the same, or substantially the same, operations as IMU 202 of FIG. 2. For example, IMU 402 may include an accelerometer 404, which may be the same as, may be substantially similar to, and/or may perform the same, or substantially the same, operations as accelerometers 204 of FIG. 2. Additionally or alternatively, IMU 402 may include a magnetometer 406, which may be the same as, may be substantially similar to, and/or may perform the same, or substantially the same, operations as magnetometer 206 of FIG. 2. Additionally or alternatively, IMU 402 may include a gyroscope 408, which may be the same as, may be substantially similar to, and/or may perform the same, or substantially the same, operations as gyroscope 208 of FIG. 2.

Inertial data 410 may be, or may include, data indicative of acceleration, orientation, angular velocity, magnetic-field direction, magnetic-field strength, and/or change in magnetic field. inertial data 410 may include acceleration data 412 (which may be, or may include, data indicative of acceleration measured by accelerometer 404), magnetic-field data 414 (which may be, or may include, data indicative of magnetic-field direction, magnetic-field strength, and/or change in magnetic field measured by magnetometer 406) and/or gyro data 416 (which may be, or may include, data indicative of orientation and/or angular velocity measured by gyroscope 408).

According to a first orientation-determination mode, orientation determiner 418 may determine orientation information 420 based on inertial data 410. For example, orientation determiner 418 may assume an initial orientation of system 400 and track the pose (e.g., location and orientation) of system 400 based on inertial data 410.

Orientation information 420 may include data indicative of an orientation of system 400. For example, orientation information 420 may be, or may include, a roll, pitch, and yaw angle indicating an orientation of system 400.

Camera 422 may be the same as, may be substantially similar to, and/or may perform the same, or substantially the same, operations as image sensor 210 of FIG. 2. Camera 422 may be a scene-facing camera that may capture image data 424, which may represent a scene in which system 400 is being used (e.g., worn).

According to a second orientation-determination mode, orientation determiner 426 may determine orientation information 428 based on image data 424. Orientation determiner 426 perform operations that are the same as, or substantially similar to the operations described with regard to SLAM system 300. For example, orientation determiner 426 may identify features in successive instances of image data 424 and determine how the position of the features in the successive images changes and determine how a pose of system 400 has changed based on the change in position of the features from image to image.

For example, in some aspects, camera 422 may capture several frames of image data 424. Image data 424 may include, for example, 10 frames in each time window. Orientation determiner 426 may estimate relative orientation between camera frames via feature matching. Further, orientation determiner 426 may solve for orientation of each frame. Orientation determiner 426 may use frames labeled s and t between time windows to compute the transformation into a common coordinate system. Orientation determiner 426 may solving for orientation of each frame within window which may improve the accuracy of orientation estimates.

In other aspects, orientation determiner 426 may estimate orientation information 428 based on blur in image data 424. For example, orientation determiner 426 may use motion blur patterns to estimate angular velocity which can be used in an EKF framework to estimate gyroscope biases.

In some aspects, orientation determiner 426 may determine orientation information 428 based on image data 424 and inertial data 410. For example, in some aspects, orientation determiner 426 may perform operations similar to, or the same as, the operations described with regard to orientation determiner 418 using inertial data 410 to determine orientation information 428 in addition to the operations described with regard to orientation determiner 426 using image data 424 to determine orientation information 428.

Additionally, orientation determiner 426 may determine bias data 430 based on orientation information 428 and orientation information 420. For example, orientation determiner 426 may compare orientation information 420 and orientation information 428 and determine bias data 430 based on the comparison. For example, orientation determiner 426 may take orientation information 428 (based on image data 424) as an accurate determination regarding the pose of system 400. orientation determiner 426 may compare orientation information 428 to orientation information 420 and determine a difference between orientation information 420 and orientation information 428. Further, orientation determiner 426 may determine a bias of IMU 402 that caused the difference. Further still, orientation determiner 426 may determine how to correct such a bias.

Bias data 430 may include an indication of the difference between orientation information 420 and orientation information 428, an indication of the bias of IMU 402, and/or an indication of how to correct the bias of IMU 402. For example, bias data 430 may be, or may include, an indication of a bias of, or a correction to apply to, acceleration data 412, an indication of a bias of, or a correction to apply to, magnetic-field data 414 (e.g., an indication of a magnetic bias), and/or an indication of a bias of, or a correction to, apply gyro data 416 (e.g., an indication of a gyroscopic bias of gyroscope 408).

Orientation determiner 418 may adjust how orientation determiner 418 uses inertial data 410 based on bias data 430. For example, orientation determiner 418 may adjust acceleration data 412 based on an indication of an accelerometer bias, magnetic-field data 414 based on an indication of a magnetic bias, and/or gyro data 416 based on an indication of a gyroscopic bias.

In some aspects, system 400 may switch between the first orientation-determination mode and the second orientation-determination mode. For example, determining orientation information 428 based on image data 424 (e.g., according to the second orientation-determination mode) may be more computationally expensive (e.g., consume more power and/or take more time) than determining orientation information 420 based on inertial data 410 (e.g., according to the first orientation-determination mode). Using the IMU to determine IMU-based orientations (and not using images to determine image-based orientations) may conserve computational resources (e.g., power, processing bandwidth, etc.).

System 400 may use orientation determiner 418 to determine orientation information 420 based on inertial data 410 (e.g., according to the first orientation-determination mode) more frequently than system 400 uses orientation determiner 426 to determine orientation information 428 (e.g., according to the second orientation-determination mode). For example, system 400 may use orientation determiner 418 to determine orientation information 420 one hundred or more times each second while system 400 may use orientation determiner 426 to determine orientation information 428 periodically, for example, every 5 seconds, 10 seconds, 20 seconds etc. In some aspects, when system 400 is in the second orientation-determination mode, orientation determiner 418 may continue to generate orientation information 420 and system 400 may continue to output orientation information 420. For example, system 400 may, or may not, disable or bypass orientation determiner 418 and orientation determiner 418 may continue to generate orientation information 420 while orientation determiner 426 generates orientation information 428.

In some aspects, orientation determiner 426 may determine bias data 430 (e.g., according to the second orientation-determination mode) and orientation determiner 418 may adjust how orientation determiner 418 uses inertial data 410 based on bias data 430 when system 400 is initialized, for example, when a device including system 400 is powered on. Additionally or alternatively, orientation determiner 426 may determine bias data 430 (e.g., according to the second orientation-determination mode) and orientation determiner 418 may adjust how orientation determiner 418 uses inertial data 410 based on bias data 430 periodically, for example, every 5 seconds, 10 seconds, 20 seconds etc.

In some aspects, system 400 may output orientation information 428, when orientation information 428 is available (e.g., when system 400 is in the second orientation-determination mode). Alternatively, system 400 may output orientation information 420 continuously and may, or may not, output orientation information 428. For example, when system 400 is in the second orientation-determination mode, orientation determiner 418 may continue to generate orientation information 420 and system 400 may continue to output orientation information 420. Additionally, when system 400 is in the second orientation-determination mode, orientation determiner 426 may determine bias data 430 and provide bias data 430 to orientation determiner 418. Orientation determiner 418 may use bias data 430 and continue to determine orientation information 420 based on bias data 430, for example, until another instance (e.g., an updated instance) of bias data 430 is determined. For example, orientation determiner 418 may use a Kalman filter to track bias of inertial data 410 over time (e.g., between receiving instances of bias data 430).

Additionally, in some aspects, system 400 may adjust a frame-capture rate of camera 422 (and a corresponding rate of orientation determiner 426 determining orientation information 428) based on an angular velocity of system 400. For example, system 400 may decrease a frame-capture rate of camera 422 based on an angular velocity of system 400 being low and increase the frame-capture rate of camera 422 based on the angular velocity of system 400 being high.

When system 400 is stable (e.g., not moving or reorienting), the orientation of system 400 may remain the same. Running the second orientation-determination mode when system 400 is not moving or reorienting may generate repeat instances of orientation information 428 that are the same (e.g., indicating the same orientation over and over), consuming power without generating new orientation information. Conversely, when system 400 is moving or reorienting quickly, it may be valuable to determine orientation information 428 at a faster rate to determine more instances of orientation information 428 because each may represent a different, updated orientation.

Accordingly, system 400 may determine an angular velocity of system 400 (e.g., based on inertial data 410 and/or orientation information 420). Further, system 400 may determine a frame-capture rate for camera 422 (and a corresponding rate of orientation determiner 426 determining orientation information 428) based on the angular velocity of system 400.

In some aspects, there may be no need to maintain a map in orientation determiner 426. Map information may be important for 6DOF estimation (e.g., determining position and/or translation information). Map information can be used to determine a position of a camera with respect to a scene. For example, objects in a map of a scene may appear larger in images of the scene when the camera is closer to the objects and the objects in the map may appear smaller in images of the scene when the camera is farther from the objects. Orientation determiner 426 may estimate an orientation of a camera without using a map because orientation determiner 426 may determine orientation information and not position information.

Figure 5:
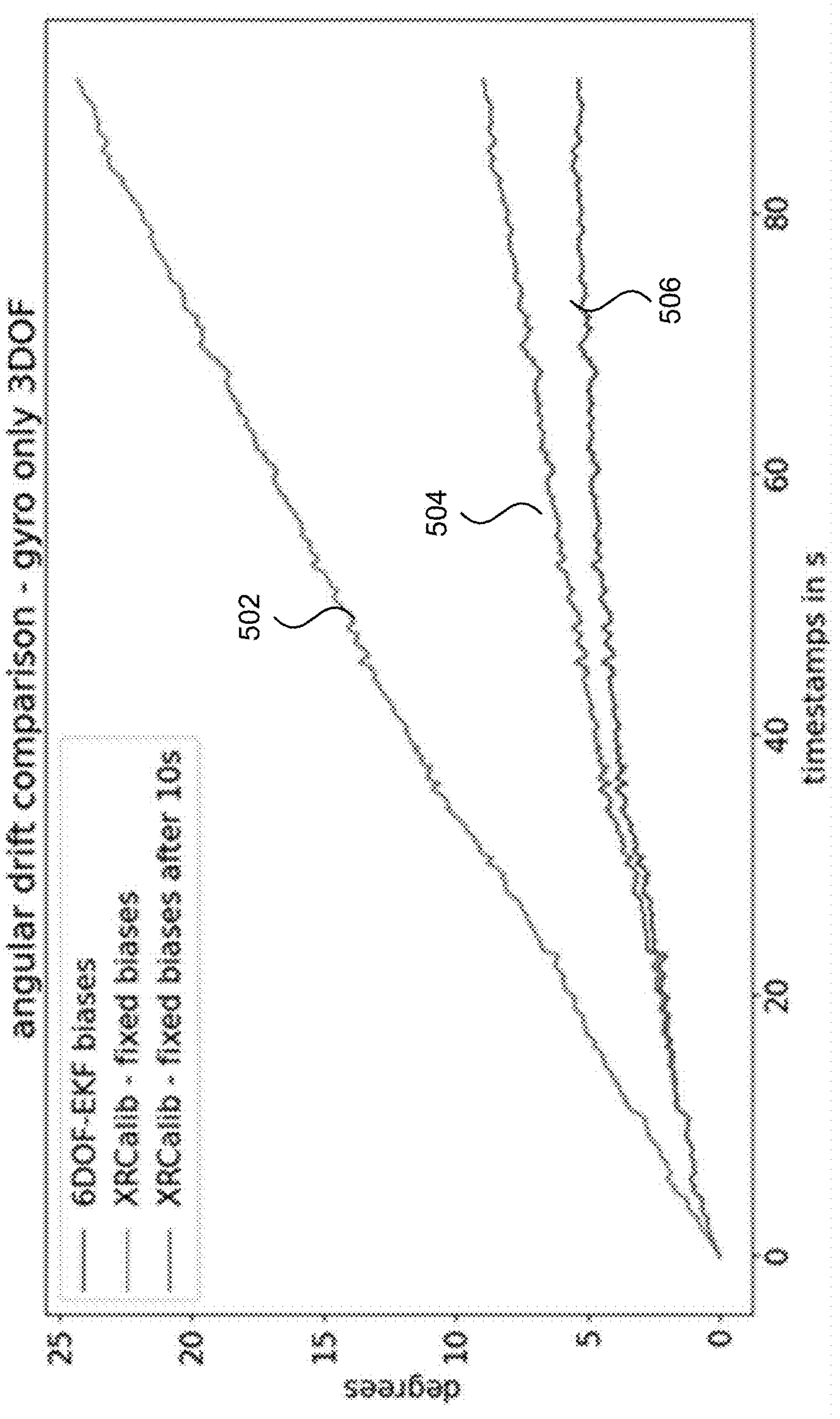
FIG. 5 includes a graph that illustrates a drift of a gyroscope over time.

FIG. 5 includes a graph 500 that illustrates a drift of a gyroscope over time. For example, graph 500 includes data 502, data 504, and data 506 illustrating an angular drift of gyroscopic data in various scenarios over time.

Data 502 illustrates a scenario in which a bias is fixed. For example, in the scenario illustrated by data 502, the bias may be pre-determined or determined and fixed at time=0. After about 60 seconds, data 502 has drifted by over 15 degrees.

Data 504 illustrates a scenario in which a bias is determined several times during the first 10 seconds, then fixed. Data 504 represents an improvement over data 502. For example, after about 60 seconds, data 504 has drifted by over 5 degrees.

Data 506 illustrates a scenario in which the bias is determined and tracked over time using an extended Kalman filter (EKF). The bias may be determined using a VSLAM method. Data 506 represents an improvement over data 504. For example, after about 60 seconds, data 506 has drifted by less than 5 degrees. Graph demonstrates that a bias estimated from VSLAM/Camera-based methods is accurate and can be used to improve tracking accuracy over time.

Figure 6:
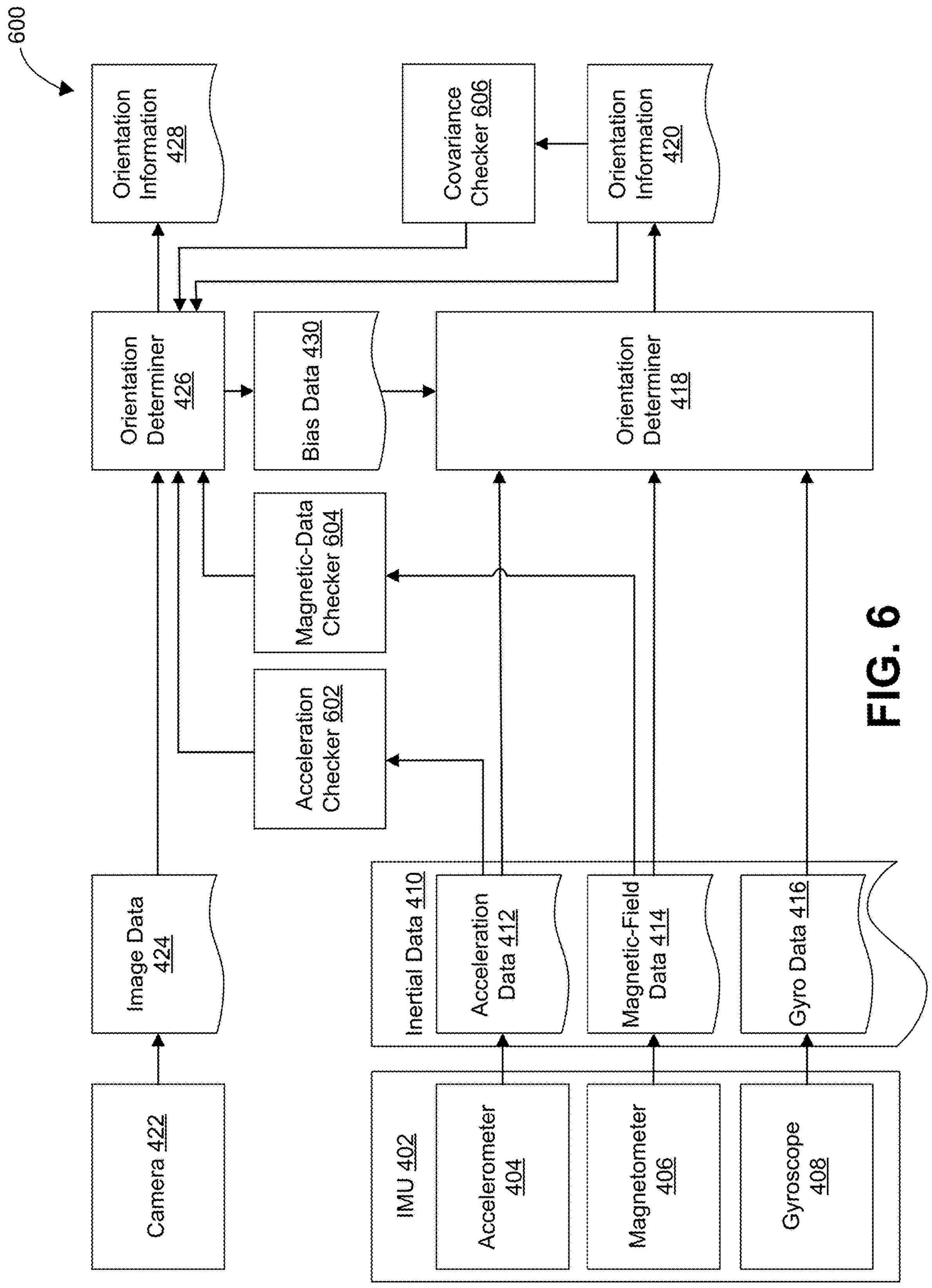
FIG. 6 is a block diagram illustrating an example system for generating orientation information, according to various aspects of the present disclosure.

FIG. 6 is a block diagram illustrating an example system 600 for generating orientation information 420, according to various aspects of the present disclosure. System 600 may be similar to system 400 of FIG. 4. For example, according to a first orientation-determination mode, orientation determiner 418 may determine orientation information 420 based on inertial data 410 from IMU 402. Additionally, according to the first orientation-determination mode, orientation determiner 418 may determine how to use inertial data 410 based on bias data 430. According to a second orientation-determination mode, orientation determiner 426 may determine orientation information 428 based on image data 424 from camera 422. Additionally, orientation determiner 426 may determine bias data 430 based on orientation information 428 and orientation information 420.

In addition to the operations described with regard to system 400 of FIG. 4, system 600 includes means for determining to update or determine bias data 430. For example, system 600 includes an acceleration checker 602 that may determine to determine or update bias data 430 based on acceleration data 412. For instance, acceleration checker 602 may compare acceleration data 412 to an acceleration threshold; and in response to acceleration data 412 exceeding the acceleration threshold, acceleration checker 602 may instruct orientation determiner 426 to determine or update bias data 430.

For instance, orientation determiner 418 may, among other things, use acceleration data 412 from accelerometer 404 to determine the direction of gravity so that a system that uses orientation information 420 may align a horizon of virtual content with the real-world horizon. Accelerometer 404 may have a difficult time determining the direction of gravity if accelerometer 404 is moving. Acceleration checker 602 may check acceleration data 412 (e.g., continuously or at intervals) to determine if acceleration data 412 exceeds the acceleration and to determine that orientation determiner 418 should apply a correction to acceleration data 412 (e.g., based on accelerometer 404 moving).

As another example, when acceleration is high, orientation information 420 estimated by orientation determiner 418 may be inaccurate because a significant linear acceleration may affect components inside an accelerometer which may affect acceleration measurements. Acceleration checker 602 may determine that there is a significant linear acceleration and system 600 may switch to the second orientation-determination mode. System 600 may use the orientation information 428 determined by orientation determiner 426 so system 600 can deliver accurate orientation estimates (e.g., corrected orientation information 420). Because vision-based orientation-determination methods (e.g., as implemented by orientation determiner 426) may be immune/robust to linear accelerations of the system, orientation determiner 426 may be used to determine orientation information 428 even when linear acceleration is high. Additionally or alternatively, bias data 430, as determined by orientation determiner 426, can also be used by orientation determiner 418 to correct orientation information 420. However, estimating accurate bias alone may not be sufficient when there's significant linear acceleration component in accelerometer measurements.

As another example, system 600 includes magnetic-data checker 604 that may determine to determine or update bias data 430 based on magnetic-field data 414. For instance, magnetic-data checker 604 may determine a magnetic dip angle based on magnetic-field data 414 and compare the magnetic dip angle to a reference dip angle. If the determined magnetic dip angle deviates from the reference dip angle beyond a dip-angle threshold, magnetic-data checker 604 may instruct orientation determiner 426 to determine or update bias data 430.

For instance, magnetic fields caused by magnetic events, such as may result from a phone joining a call, may interfere with normal magnetic measurements of magnetometer 406. For example, a magnetic event may cause magnetic "noise" that may make cause magnetometer 406 to generate magnetic-field data 414 that is mostly "noise." Magnetic-data checker 604 may check magnetic-field data 414 (e.g., continuously or at intervals) to determine if a magnetic dip angle of magnetic-field data 414 exceeds the dip-angle threshold and to determine that system 600 should switch to a second orientation-determination mode and determine orientation information 420 based, at least in part, on orientation information 428. Additionally or alternatively, system 600 may determine to cause orientation determiner 426 to determine bias data 430 and orientation determiner 418 to adjust orientation data (e.g., yaw) based on bias data 430, which may be based on a magnetic event. Orientation determiner 426 may be more useful in during a magnetic event because orientation determiner 426 may be immune/robust to magnetic disturbances. So, system 600 may output orientation information 428 or use orientation information 428 to determine orientation information 420.

As yet another example, system 600 includes covariance checker 606 that may determine to determine or update bias data 430 based on orientation information 420. For instance, covariance checker 606 may determine a covariance based on orientation information 420 and compare the covariance to a covariance threshold. If the determined covariance exceeds a covariance threshold, covariance checker 606 may instruct orientation determiner 426 to determine or update bias data 430.

For instance, a covariance of orientation information 420 may increase based on noise (such as from a magnetic disturbance). Covariance checker 606 may check orientation information 420 (e.g., continuously or at intervals) to determine if a covariance of orientation information 420 has increased beyond a threshold and to determine that orientation determiner 418 should adjust how orientation determiner 418 uses inertial data 410 to compensate.

In response to an instruction to update bias data 430 (from any of acceleration checker 602, magnetic-data checker 604, or covariance checker 606, orientation determiner 426 may request image data 424 from camera 422. For example, in some aspects, while system 400 is in the first orientation-determination mode, system 400 may disable or bypass orientation determiner 426. Camera 422 may, or may not, capture image data (e.g., for other purposes or tasks). However, if orientation determiner 426 is disabled or bypassed, orientation determiner 426 may not determine orientation information 428 and/or bias data 430 based on image data 424.

Orientation determiner 426 may determine orientation information 428 based on the requested image data 424 and compare orientation information 428 to orientation information 420 and determine or update bias data 430 based on the comparison.

Figure 7:
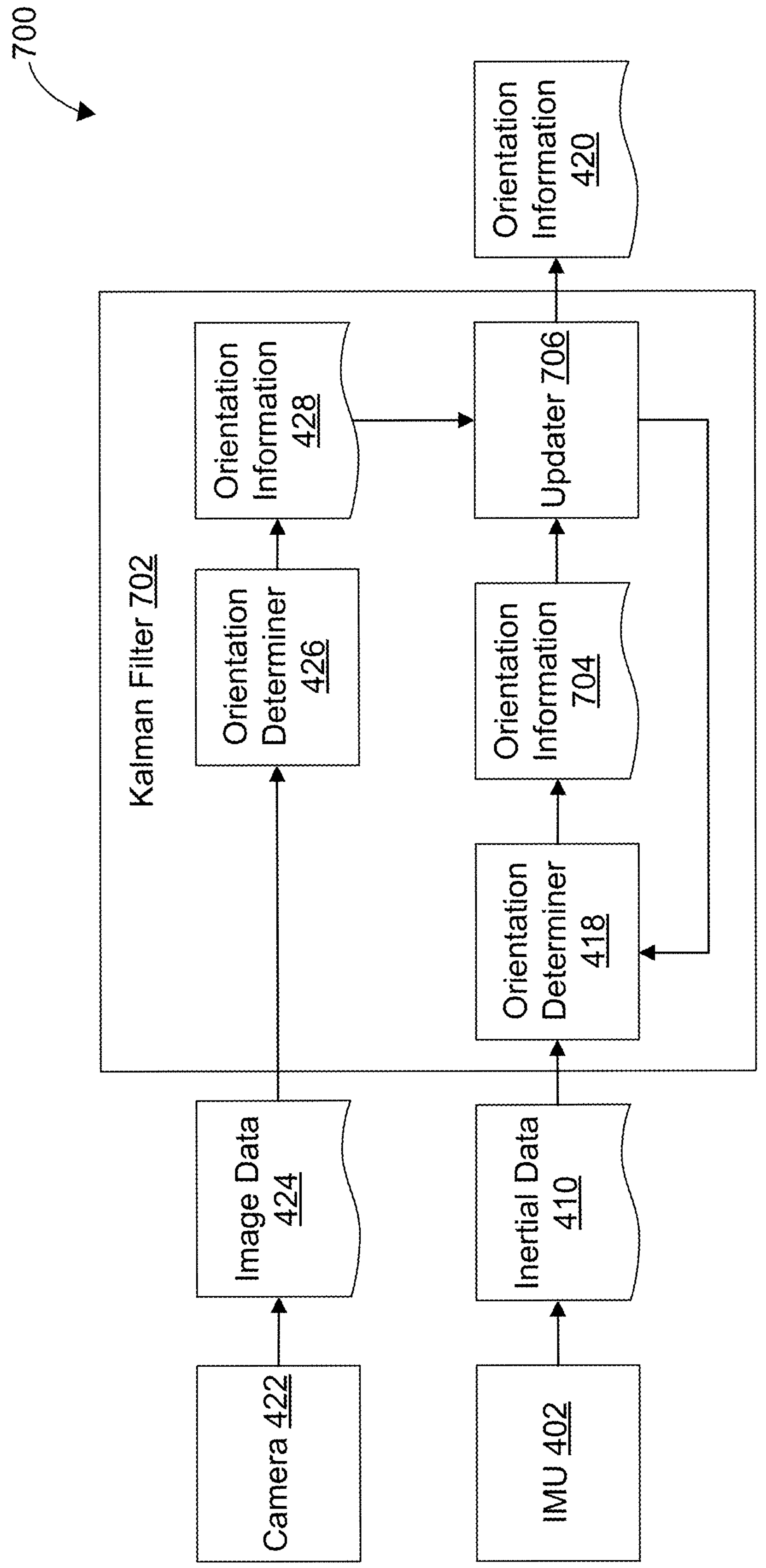
FIG. 7 is a block diagram illustrating an example system for determining orientation information, according to various aspects of the present disclosure.

FIG. 7 is a block diagram illustrating an example system 700 for determining orientation information 420, according to various aspects of the present disclosure. System 700 illustrates an example method for using orientation information 428 to revise how orientation determiner 418 determines orientation information 420, according to various aspects of the present disclosure. For example, system 700 implements a Kalman filter 702 to track orientation information based on inertial data 410 and image data 424.

For example, Kalman filter 702 may be an extended Kalman filter (EKF). Kalman filter 702 may track state: [q=orientation, b=gyro bias]. Kalman filter 702 may use inertial data 410 to propagate the state. Updater 706 of Kalman filter 702 may use orientation information 428 as measurement data to update orientation information 704. Orientation determiner 418 may determine orientation information 704, which may be a preliminary or intermediate orientation determination subject to updating by Kalman filter 702. Orientation information 704 may provide reliable bias and orientation estimates which can be used in Kalman filter 702 during challenging scenarios.

Figure 8:
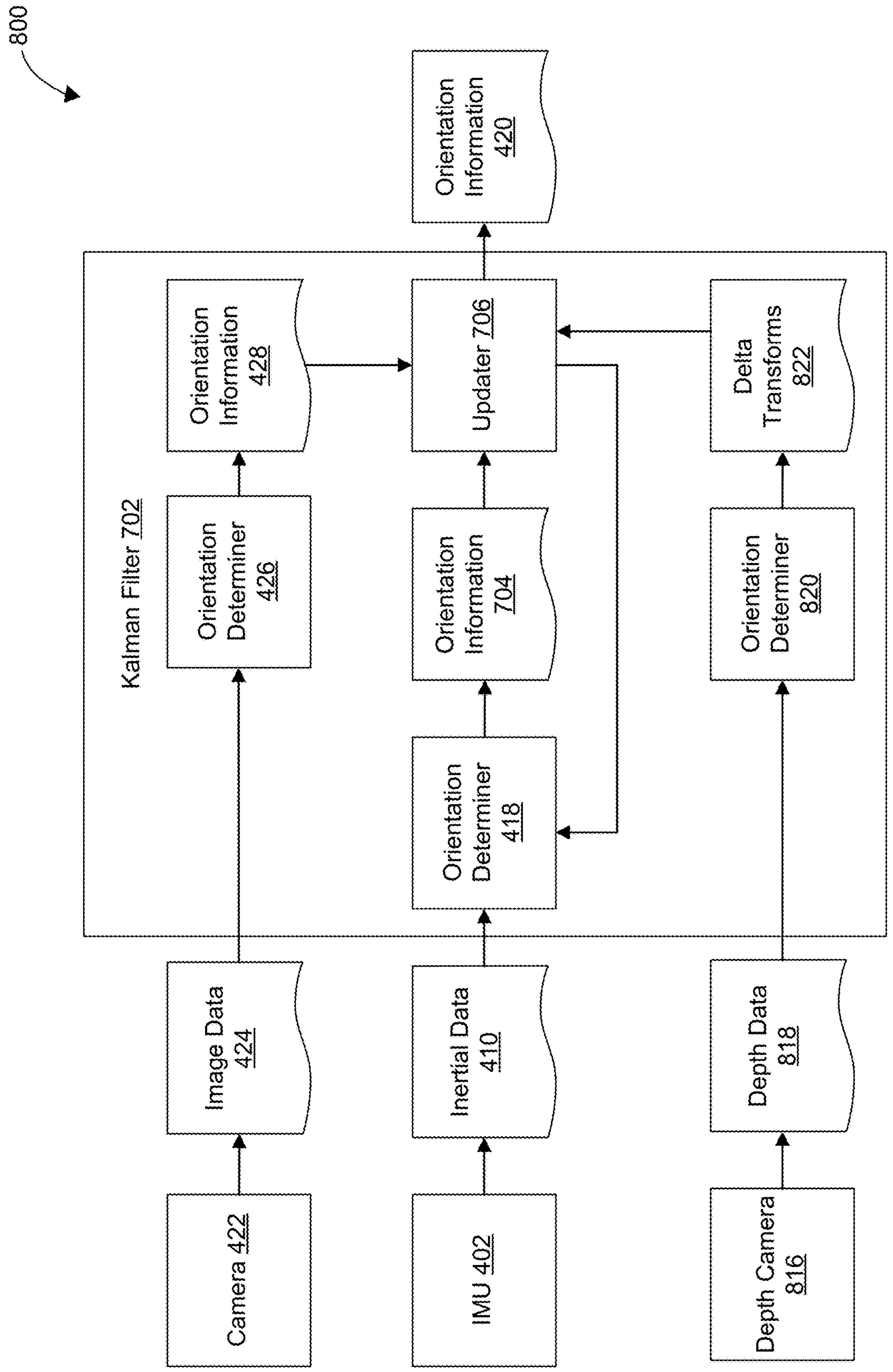
FIG. 8 is a block diagram illustrating an example system for determining orientation information, according to various aspects of the present disclosure.

FIG. 8 is a block diagram illustrating an example system 800 for determining orientation information 420, according to various aspects of the present disclosure. Includes system 700.

In some aspects, depth cameras can also be used for reliable 3DOF estimates. For example, in some aspects, system 800 may include a depth camera 816. Depth camera 816 may generate depth data 818. Orientation determiner 820 may detect and track 3D features (e.g., fast point feature histograms (FPFH)) across frames (e.g., of depth data 818) to estimate orientation (or delta orientation). Orientation determiner 820 may estimate delta transforms 822 using iterative closest point (ICP). Updater 706 may use delta transforms 822 in EKF/filtering framework to get accurate biases and orientation during this duration. Delta transforms 822 may include a translation component, which can further be used to estimate accelerometer biases in a similar EKF framework.

For example, in some aspects, depth camera 816 may capture several frames of depth data 818. Depth data 818 may include, for example, 10 frames in each time window. Orientation determiner 820 may estimate relative orientation between camera frames via 3D feature matching (FPFH). Further, orientation determiner 820 may estimate for orientation of each frame (e.g., using ICP).

Figure 9:
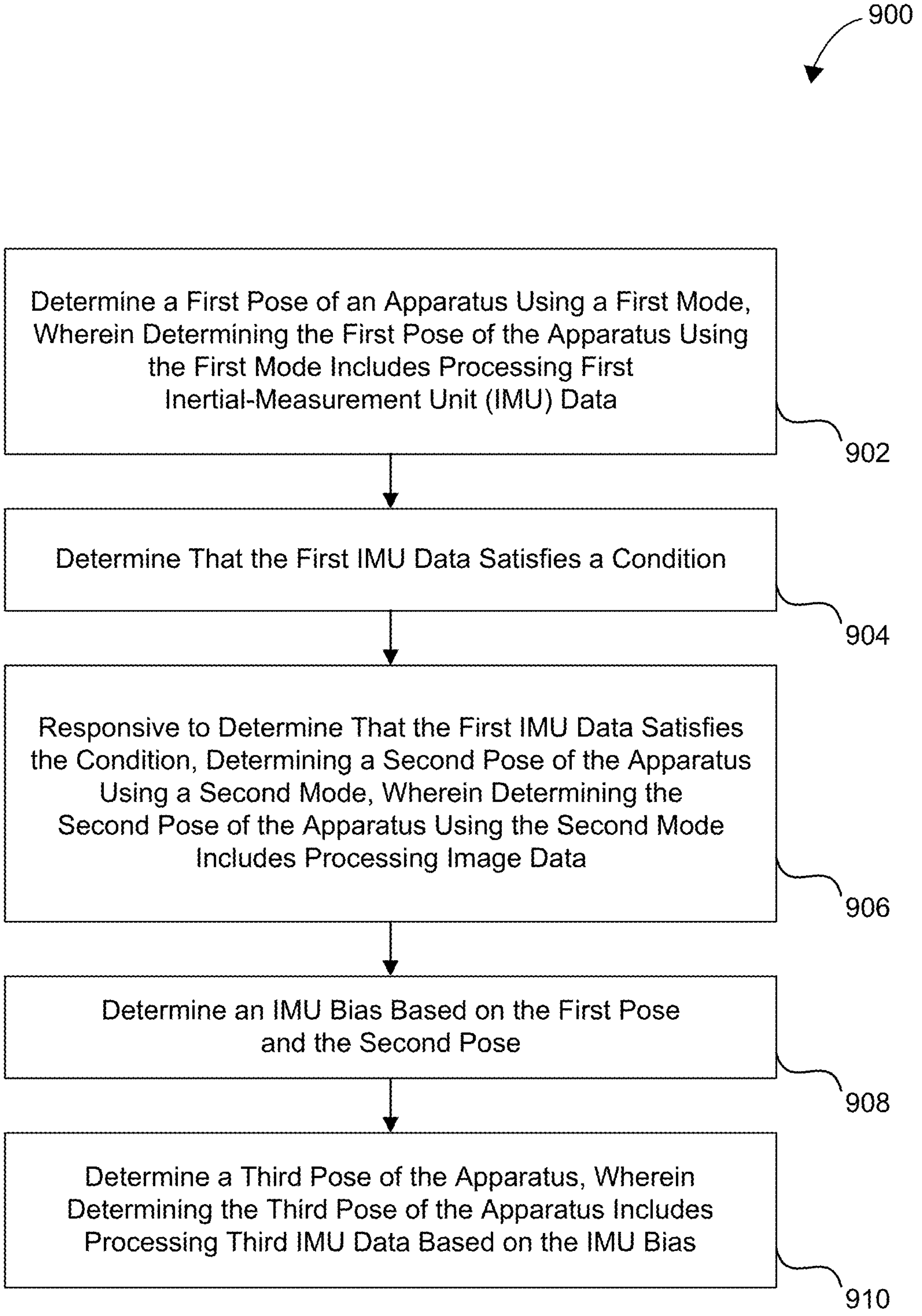
FIG. 9 is a flow diagram illustrating an example process for determining orientation information, in accordance with aspects of the present disclosure.

FIG. 9 is a flow diagram illustrating an example process 900 for determining orientation information, in accordance with aspects of the present disclosure. One or more operations of process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 900. The one or more operations of process 900 may be implemented as software components that are executed and run on one or more processors.

At block 902, a computing device (or one or more components thereof) may determine a first pose of an apparatus using a first mode, wherein determining the first pose of the apparatus using the first mode includes processing first inertial-measurement unit (IMU) data. For example, system 400 may (according to a first orientation-determination mode) use orientation determiner 418 to determine orientation information 420 based on inertial data 410.

At block 904, the computing device (or one or more components thereof) may determine that the first IMU data satisfies a condition. For example, system 400 may determine that inertial data 410 satisfies a condition.

At block 906, the computing device (or one or more components thereof) may, responsive to determining that the first IMU data satisfies the condition, determine a second pose of the apparatus using a second mode, wherein determining the second pose of the apparatus using the second mode includes processing image data. For example, system 400 may (according to a first orientation-determination mode) use orientation determiner 426 to determine orientation information 428 based on image data 424.

In some aspects, the second pose of the apparatus is determined using the second mode based on the image data and third IMU data. For example, orientation determiner 426 may determine orientation information 428 based on image data 424 and orientation information 420.

At block 908, the computing device (or one or more components thereof) may determine an IMU bias based on the first pose and the second pose. For example, orientation determiner 426 may determine bias data 430 based on orientation information 420 and orientation information 428.

In some aspects, the condition is based on a magnetic dip angle. For example, magnetic-data checker 604 may determine that a magnetic dip angle of magnetic-field data 414 deviates from a reference dip angle.

In some aspects, to determine that the first IMU data satisfies the condition, the computing device (or one or more components thereof) may determine that a magnetic dip angle of the first IMU data deviates from a reference dip angle beyond a dip-angle threshold. For example, magnetic-data checker 604 may determine that a magnetic dip angle of magnetic-field data 414 deviates from a reference dip angle.

In some aspects, to determine that the first IMU data satisfies the condition, the computing device (or one or more components thereof) may determine that an acceleration of the first IMU data exceeds an acceleration threshold. For example, acceleration checker 602 may determine that acceleration data 412 exceeds an acceleration threshold.

In some aspects, to determine that the first IMU data satisfies the condition, the computing device (or one or more components thereof) may determine that a covariance based on the first IMU data exceeds a covariance threshold. for example, covariance checker 606 may determine a covariance based on orientation information 420 exceeds a covariance threshold.

At block 910, the computing device (or one or more components thereof) may determine a third pose of the apparatus, wherein determining the third pose of the apparatus includes processing second IMU data based on the IMU bias. For example, orientation determiner 418 may determine orientation information 420 (e.g., an additional instance of orientation information 420) based on inertial data 410 and bias data 430.

In some aspects, the IMU bias is determined using a Kalman filter; and the third orientation of the apparatus is determined further using the Kalman filter. For example, system 700 may determine bias data 430 using Kalman filter 702. Further, system 700 may determine orientation information 420 using Kalman filter 702.

In some aspects, the computing device (or one or more components thereof) may include, an IMU comprising a magnetometer, wherein the IMU bias comprises a magnetic bias of the magnetometer. For example, XR system 200 may include IMU 202 including magnetometer 206.

In some aspects, the computing device (or one or more components thereof) may include, an IMU comprising an accelerometer. For example, XR system 200 may include IMU 202 including accelerometer 204.

In some aspects, the computing device (or one or more components thereof) may include an IMU comprising a gyroscope sensor, wherein the IMU bias comprises a gyroscopic bias of the gyroscope sensor. For example, XR system 200 may include IMU 202 including gyroscope 208. Bias data 430 may include a gyroscope bias.

In some aspects, the computing device (or one or more components thereof) may render content based on the third pose. For example, rendering engine 234 may render content based on orientation information 420.

In some aspects, the computing device (or one or more components thereof) may a location of a device within an environment based on the third pose. For example, system 400 may determine a pose of a device, such as XR device 102, based on orientation information 420.

In some aspects, the computing device (or one or more components thereof) may cause at least one transmitter to transmit the third pose to a computing device. For example, XR device 102 may cause a transmitter to transmit orientation determiner 418.

In some aspects, the computing device (or one or more components thereof) may determine a processing rate for the second mode to process image data to determine poses based on an angular velocity of the apparatus. For example, system 400 may determine a rate at which to use orientation determiner 426 to determine orientation information 428 based on an angular velocity (e.g., as measured by inertial data 410).

In some examples, as noted previously, the methods described herein (e.g., process 900 of FIG. 9, and/or other methods described herein) can be performed, in whole or in part, by a computing device or apparatus. In one example, one or more of the methods can be performed by XR device 102 of FIG. 1, XR system 200 of FIG. 2, SLAM system 300 of FIG. 3, system 400 of FIG. 4, system 600 of FIG. 6, or by another system or device. In another example, one or more of the methods (e.g., process 900, and/or other methods described herein) can be performed, in whole or in part, by the computing-device architecture 1000 shown in FIG. 10. For instance, a computing device with the computing-device architecture 1000 shown in FIG. 10 can include, or be included in, the components of the XR device 102, XR system 200, SLAM system 300, system 400, system 600, and can implement the operations of process 900, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 900, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 900, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 10:
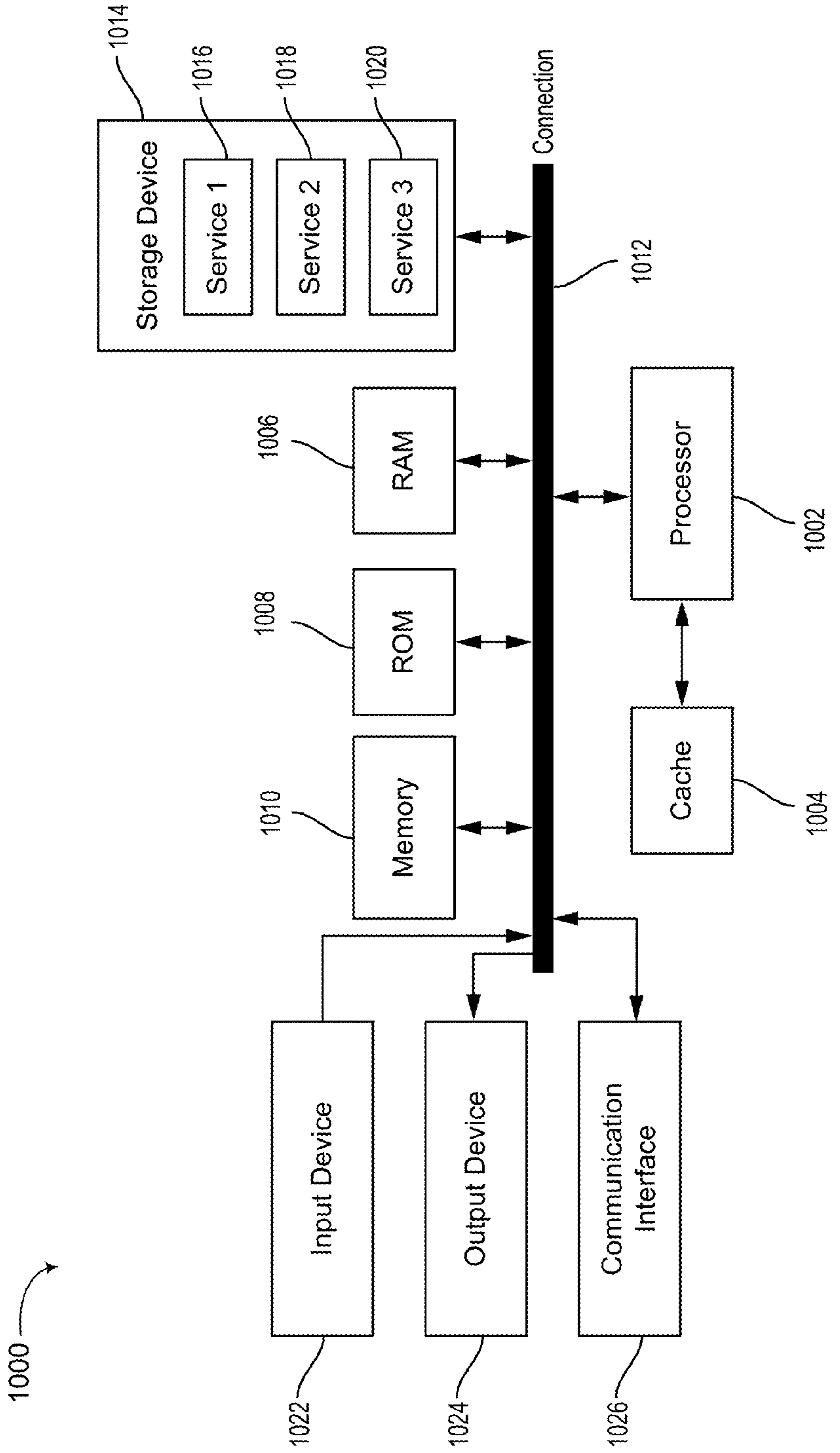
FIG. 10 is a block diagram illustrating an example computing-device architecture of an example computing device which can implement the various techniques described herein.

FIG. 10 illustrates an example computing-device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1000 may include, implement, or be included in any or all of XR device 102 of FIG. 1, XR system 200 of FIG. 2, SLAM system 300 of FIG. 3, system 400 of FIG. 4, system 600 of FIG. 6 and/or other devices, modules, or systems described herein. Additionally or alternatively, computing-device architecture 1000 may be configured to perform process 900, and/or other process described herein.

The components of computing-device architecture 1000 are shown in electrical communication with each other using connection 1012, such as a bus. The example computing-device architecture 1000 includes a processing unit (CPU or processor) 1002 and computing device connection 1012 that couples various computing device components including computing device memory 1010, such as read only memory (ROM) 1008 and random-access memory (RAM) 1006, to processor 1002.

Computing-device architecture 1000 can include a cache of high-speed memory connected directly with, in close proximity to, or integrated as part of processor 1002. Computing-device architecture 1000 can copy data from memory 1010 and/or the storage device 1014 to cache 1004 for quick access by processor 1002. In this way, the cache can provide a performance boost that avoids processor 1002 delays while waiting for data. These and other modules can control or be configured to control processor 1002 to perform various actions. Other computing device memory 1010 may be available for use as well. Memory 1010 can include multiple different types of memory with different performance characteristics. Processor 1002 can include any general-purpose processor and a hardware or software service, such as service 1 1016, service 2 1018, and service 3 1020 stored in storage device 1014, configured to control processor 1002 as well as a special-purpose processor where software instructions are incorporated into the processor design. Processor 1002 may be a self-contained system, containing multiple cores or processors, a bus, memory controller, cache, etc. A multi-core processor may be symmetric or asymmetric.

To enable user interaction with the computing-device architecture 1000, input device 1022 can represent any number of input mechanisms, such as a microphone for speech, a touch-sensitive screen for gesture or graphical input, keyboard, mouse, motion input, speech and so forth. Output device 1024 can also be one or more of a number of output mechanisms known to those of skill in the art, such as a display, projector, television, speaker device, etc. In some instances, multimodal computing devices can enable a user to provide multiple types of input to communicate with computing-device architecture 1000. Communication interface 1026 can generally govern and manage the user input and computing device output. There is no restriction on operating on any particular hardware arrangement and therefore the basic features here may easily be substituted for improved hardware or firmware arrangements as they are developed.

Storage device 1014 is a non-volatile memory and can be a hard disk or other types of computer readable media which can store data that are accessible by a computer, such as magnetic cassettes, flash memory cards, solid state memory devices, digital versatile discs (DVDs), cartridges, random-access memories (RAMs) 1006, read only memory (ROM) 1008, and hybrids thereof. Storage device 1014 can include services 1016, 1018, and 1020 for controlling processor 1002. Other hardware or software modules are contemplated. Storage device 1014 can be connected to the computing device connection 1012. In one aspect, a hardware module that performs a particular function can include the software component stored in a computer-readable medium in connection with the necessary hardware components, such as processor 1002, connection 1012, output device 1024, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A device for determining pose information, the device comprising: at least one memory; and at least one processor coupled to the at least one memory and configured to: determine a first pose of an apparatus using a first mode, wherein determining the first pose of the apparatus using the first mode includes processing first inertial-measurement unit (IMU) data; determine that the first IMU data satisfies a condition; responsive to determining that the first IMU data satisfies the condition, determine a second pose of the apparatus using a second mode, wherein determining the second pose of the apparatus using the second mode includes processing image data; determine an IMU bias based on the first pose and the second pose; and determine a third pose of the apparatus, wherein determining the third pose of the apparatus includes processing second IMU data based on the IMU bias.

Aspect 2. The device of aspect 1, wherein the condition is based on a magnetic dip angle.

Aspect 3. The device of any one of aspects 1 or 2, wherein, to determine that the first IMU data satisfies the condition, the at least one processor is configured to determine that a magnetic dip angle of the first IMU data deviates from a reference dip angle beyond a dip-angle threshold.

Aspect 4. The device of any one of aspects 1 to 3, wherein, to determine that the first IMU data satisfies the condition, the at least one processor is configured to determine that an acceleration of the first IMU data exceeds an acceleration threshold.

Aspect 5. The device of any one of aspects 1 to 4, wherein, to determine that the first IMU data satisfies the condition, the at least one processor is configured to determine that a covariance based on the first IMU data exceeds a covariance threshold.

Aspect 6. The device of any one of aspects 1 to 5, further comprising an IMU comprising a magnetometer, wherein the IMU bias comprises a magnetic bias of the magnetometer.

Aspect 7. The device of any one of aspects 1 to 6, further comprising an IMU comprising an accelerometer.

Aspect 8. The device of any one of aspects 1 to 7, further comprising an IMU comprising a gyroscope sensor, wherein the IMU bias comprises a gyroscopic bias of the gyroscope sensor.

Aspect 9. The device of any one of aspects 1 to 8, wherein the second pose of the apparatus is determined using the second mode based on the image data and third IMU data.

Aspect 10. The device of any one of aspects 1 to 9, wherein IMU bias is determined using a Kalman filter; and third orientation of the apparatus is determined further using the Kalman filter.

Aspect 11. The device of any one of aspects 1 to 10, wherein the at least one processor is configured to determine a processing rate for the second mode to process image data to determine poses based on an angular velocity of the apparatus.

Aspect 12. The device of any one of aspects 1 to 11, wherein the at least one processor is configured to render content based on the third pose.

Aspect 13. The device of any one of aspects 1 to 12, wherein the at least one processor is configured to determine a location of a device within an environment based on the third pose.

Aspect 14. The device of any one of aspects 1 to 13, wherein the at least one processor is configured to cause at least one transmitter to transmit the third pose to a computing device.

Aspect 15. A method for determining pose information, the method comprising: determining a first pose of an apparatus using a first mode, wherein determining the first pose of the apparatus using the first mode includes processing first inertial-measurement unit (IMU) data; determining that the first IMU data satisfies a condition; responsive to determining that the first IMU data satisfies the condition, determining a second pose of the apparatus using a second mode, wherein determining the second pose of the apparatus using the second mode includes processing image data; determining an IMU bias based on the first pose and the second pose; and determining a third pose of the apparatus, wherein determining the third pose of the apparatus includes processing second IMU data based on the IMU bias.

Aspect 16. The method of aspect 15, wherein the condition is based on a magnetic dip angle.

Aspect 17. The method of any one of aspects 15 or 16, wherein determining that the first IMU data satisfies the condition comprises determining that a magnetic dip angle of the first IMU data deviates from a reference dip angle beyond a dip-angle threshold.

Aspect 18. The method of any one of aspects 15 to 17, wherein determining that the first IMU data satisfies the condition comprises determining that an acceleration of the first IMU data exceeds an acceleration threshold.

Aspect 19. The method of any one of aspects 15 to 18, wherein determining that the first IMU data satisfies the condition comprises determining that a covariance based on the first IMU data exceeds a covariance threshold.

Aspect 20. The method of any one of aspects 15 to 19, wherein the apparatus comprises an IMU comprising a magnetometer and wherein the IMU bias comprises a magnetic bias of the magnetometer.

Aspect 21. The method of any one of aspects 15 to 20, wherein the apparatus comprises an IMU comprising an accelerometer.

Aspect 22. The method of any one of aspects 15 to 21, wherein the apparatus comprises an IMU comprising a gyroscope sensor, and wherein the IMU bias comprises a gyroscopic bias of the gyroscope sensor.

Aspect 23. The method of any one of aspects 15 to 22, wherein the second pose of the apparatus is determined using the second mode based on the image data and third IMU data.

Aspect 24. The method of any one of aspects 15 to 23, wherein IMU bias is determined using a Kalman filter; and third orientation of the apparatus is determined further using the Kalman filter.

Aspect 25. The method of any one of aspects 15 to 24, further comprising determining a processing rate for the second mode to process image data to determine poses based on an angular velocity of the apparatus.

Aspect 26. The method of any one of aspects 15 to 25, further comprising rendering content based on the third pose.

Aspect 27. The method of any one of aspects 15 to 26, further comprising determining a location of a device within an environment based on the third pose.

Aspect 28. The method of any one of aspects 15 to 27, further comprising transmitting the third pose to a computing device.

Aspect 29. A non-transitory computer-readable storage medium having stored thereon instructions that, when executed by at least one processor, cause the at least one processor to perform operations according to any of aspects 15 to 28.

Aspect 30. An apparatus for providing virtual content for display, the apparatus comprising one or more means for perform operations according to any of aspects 15 to 28.

What is claimed is:

1. A device for determining pose information, the device comprising:
- at least one memory; and
- at least one processor coupled to the at least one memory and configured to:
  - determine a first pose of an apparatus using a first pose-determination mode of operation, wherein determining the first pose of the apparatus using the first pose-determination mode of operation includes processing first inertial-measurement unit (IMU) data, wherein the first pose includes a three degrees of freedom (3DOF) pose;
  - determine that the first IMU data satisfies a condition;
  - responsive to determining that the first IMU data satisfies the condition, switch from the first pose-determination mode of operation to a second pose-determination mode of operation;
  - determine a second pose of the apparatus using the second pose-determination mode of operation, wherein determining the second pose of the apparatus using the second pose-determination mode of operation includes processing image data, wherein the second pose includes a six degrees of freedom (6DOF) pose;
  - determine an IMU bias based on the first pose and the second pose;
  - switch from the second pose-determination mode of operation to the first pose-determination mode of operation; and
  - determine a third pose of the apparatus using the first pose-determination mode of operation, wherein determining the third pose of the apparatus includes processing second IMU data based on the IMU bias and wherein the third pose includes a 3DOF pose.

2. The device of claim 1, wherein the condition is based on a magnetic dip angle.

3. The device of claim 1, wherein, to determine that the first IMU data satisfies the condition, the at least one processor is configured to determine that a magnetic dip angle of the first IMU data deviates from a reference dip angle beyond a dip-angle threshold.

4. The device of claim 1, wherein, to determine that the first IMU data satisfies the condition, the at least one processor is configured to determine that an acceleration of the first IMU data exceeds an acceleration threshold.

5. The device of claim 1, wherein, to determine that the first IMU data satisfies the condition, the at least one processor is configured to determine that a covariance based on the first IMU data exceeds a covariance threshold.

6. The device of claim 1, further comprising an IMU comprising a magnetometer, wherein the IMU bias comprises a magnetic bias of the magnetometer.

7. The device of claim 1, further comprising an IMU comprising an accelerometer.

8. The device of claim 1, further comprising an IMU comprising a gyroscope sensor, wherein the IMU bias comprises a gyroscopic bias of the gyroscope sensor.

9. The device of claim 1, wherein the second pose of the apparatus is determined using the second mode based on the image data and third IMU data.

10. The device of claim 1, wherein IMU bias is determined using a Kalman filter and a third orientation of the apparatus is determined further using the Kalman filter.

11. The device of claim 1, wherein the at least one processor is configured to determine a processing rate for the second mode to process image data to determine poses based on an angular velocity of the apparatus.

12. The device of claim 1, wherein the at least one processor is configured to render content based on the third pose.

13. The device of claim 1, wherein the at least one processor is configured to determine a location of a device within an environment based on the third pose.

14. The device of claim 1, wherein the at least one processor is configured to cause at least one transmitter to transmit the third pose to a computing device.

15. A method for determining pose information, the method comprising:
- determining a first pose of an apparatus using a first pose-determination mode of operation, wherein determining the first pose of the apparatus using the first pose-determination mode of operation includes processing first inertial-measurement unit (IMU) data, wherein the first pose includes a three degrees of freedom (3DOF) pose;
- determining that the first IMU data satisfies a condition;
- responsive to determining that the first IMU data satisfies the condition, switching from the first pose-determination mode of operation to a second pose-determination mode of operation;
- determining a second pose of the apparatus using the second pose-determination mode of operation, wherein determining the second pose of the apparatus using the second pose-determination mode of operation includes processing image data, wherein the second pose includes a six degrees of freedom (6DOF) pose;

determining an IMU bias based on the first pose and the second pose;

switching from the second pose-determination mode of operation to the first pose-determination mode of operation; and determining a third pose of the apparatus using the first pose-determination mode of operation, wherein determining the third pose of the apparatus includes processing second IMU data based on the IMU bias and wherein the third pose includes a 3DOF pose.

16. The method of claim 15, wherein the condition is based on a magnetic dip angle.

17. The method of claim 15, wherein determining that the first IMU data satisfies the condition comprises determining that a magnetic dip angle of the first IMU data deviates from a reference dip angle beyond a dip-angle threshold.

18. The method of claim 15, wherein determining that the first IMU data satisfies the condition comprises determining that an acceleration of the first IMU data exceeds an acceleration threshold.

19. The method of claim 15, wherein determining that the first IMU data satisfies the condition comprises determining that a covariance based on the first IMU data exceeds a covariance threshold.

20. The method of claim 15, wherein the apparatus comprises an IMU comprising a magnetometer and wherein the IMU bias comprises a magnetic bias of the magnetometer.

* * * * *